(12) United States Patent
Webster

(10) Patent No.: US 7,578,132 B2
(45) Date of Patent: Aug. 25, 2009

(54) GAS TURBINE ENGINE EXHAUST NOZZLE

(75) Inventor: John R Webster, Derby (GB)

(73) Assignee: Rolls-Royce plc, London (GB)

( * ) Notice: Subject to any disclaimer, the term of this patent is extended or adjusted under 35 U.S.C. 154(b) by 547 days.

(21) Appl. No.: 11/014,232

(22) Filed: Dec. 17, 2004

(65) Prior Publication Data
US 2005/0229585 A1 Oct. 20, 2005

Related U.S. Application Data

(63) Continuation-in-part of application No. 10/950,551, filed on Sep. 28, 2004, now Pat. No. 7,000,378.

(51) Int. Cl.
*F02K 1/00* (2006.01)
(52) U.S. Cl. ........................... 60/770; 60/226.1
(58) Field of Classification Search ............... 60/226.1, 60/770, 771
See application file for complete search history.

(56) References Cited

U.S. PATENT DOCUMENTS

| | | | | |
|---|---|---|---|---|
| 4,556,050 A * | 12/1985 | Hodgson et al. | ............... | 600/30 |
| 5,150,864 A * | 9/1992 | Roglin et al. | ............... | 244/219 |
| 5,588,295 A * | 12/1996 | Brotz | ............... | 60/528 |
| 5,619,177 A * | 4/1997 | Johnson et al. | ............... | 337/140 |
| 6,175,989 B1 * | 1/2001 | Carpenter et al. | ............... | 16/225 |
| 6,314,721 B1 * | 11/2001 | Mathews et al. | ............... | 60/264 |
| 6,318,070 B1 * | 11/2001 | Rey et al. | ............... | 60/226.3 |
| 6,487,848 B2 * | 12/2002 | Zysman et al. | ............... | 60/262 |
| 6,532,729 B2 * | 3/2003 | Martens | ............... | 60/204 |
| 6,718,752 B2 * | 4/2004 | Nesbitt et al. | ............... | 60/204 |
| 6,735,936 B2 * | 5/2004 | Rey et al. | ............... | 60/226.3 |
| 6,813,877 B2 * | 11/2004 | Birch et al. | ............... | 60/226.1 |
| 7,000,378 B2 * | 2/2006 | Birch et al. | ............... | 60/226.1 |
| 7,085,388 B2 * | 8/2006 | Butler et al. | ............... | 381/71.3 |
| 7,216,831 B2 * | 5/2007 | Wood | ............... | 244/99.8 |
| 7,284,786 B2 * | 10/2007 | Browne et al. | ............... | 296/181.1 |
| 2004/0154283 A1 * | 8/2004 | Rey et al. | ............... | 60/226.3 |
| 2004/0237534 A1 * | 12/2004 | Webster et al. | ............... | 60/771 |
| 2006/0000211 A1 * | 1/2006 | Webster | ............... | 60/527 |
| 2006/0018761 A1 * | 1/2006 | Webster et al. | ............... | 416/233 |
| 2006/0101803 A1 * | 5/2006 | White | ............... | 60/204 |
| 2006/0101807 A1 * | 5/2006 | Wood et al. | ............... | 60/262 |

\* cited by examiner

*Primary Examiner*—William H Rodríguez
(74) *Attorney, Agent, or Firm*—Jeffrey S. Melcher; Manelli Dension & Selter PLLC

(57) ABSTRACT

A gas turbine engine exhaust nozzle arrangement for the flow of exhaust gases therethrough between an upstream end and a downstream end thereof comprising a nozzle and a plurality of tabs which extend in a generally axial direction from a downstream portion of the nozzle wherein the nozzle further comprises an actuation mechanism capable of moving the tabs between a first deployed position, where the tabs interact with a gas stream to reduce exhaust noise thereof, and a second non-deployed position, where the tabs are substantially aerodynamically unobtrusive.

65 Claims, 15 Drawing Sheets

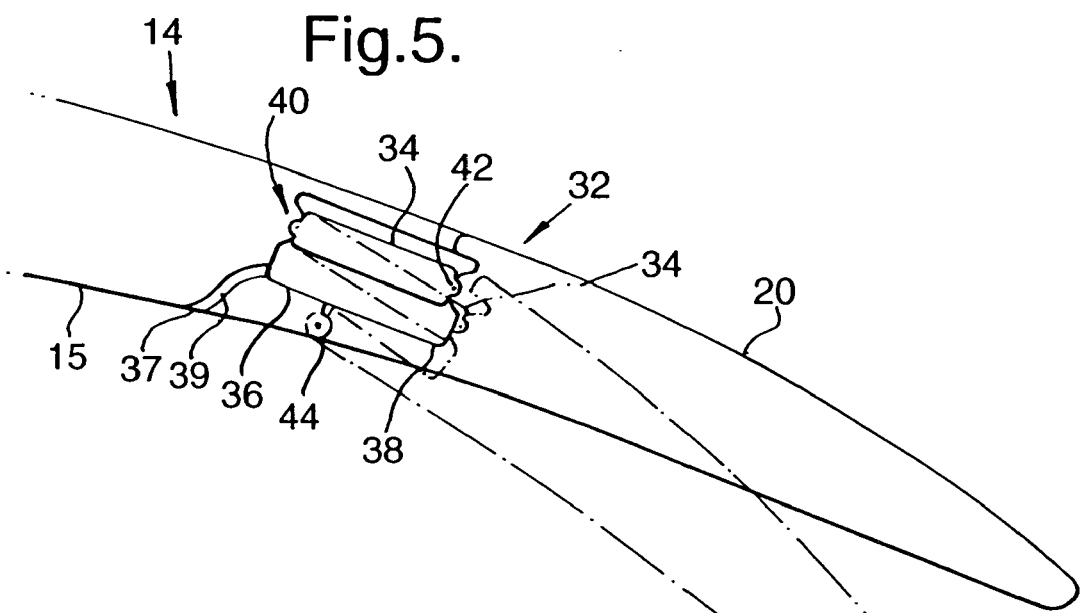
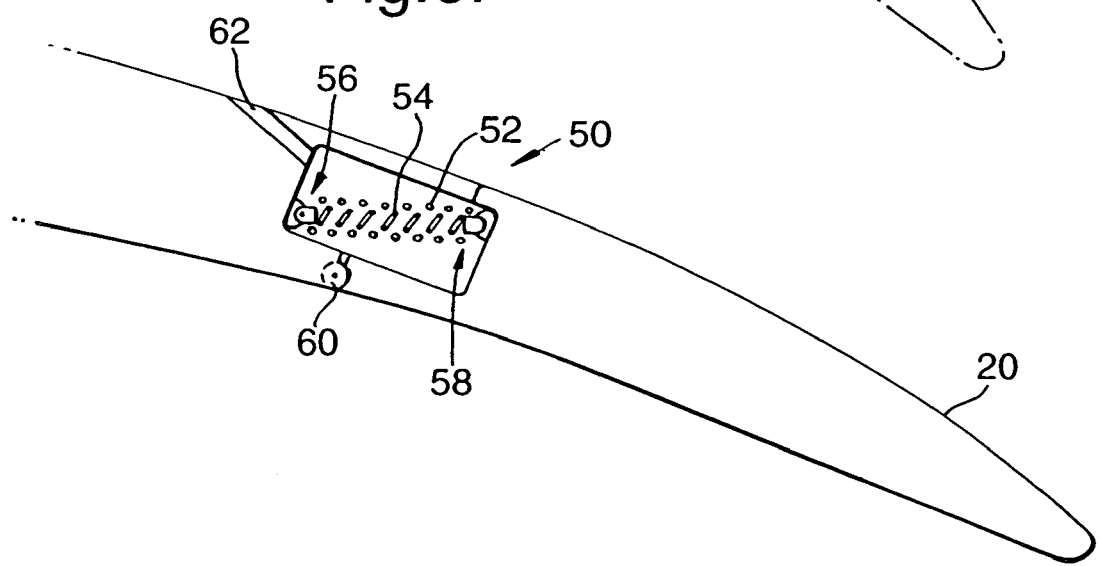

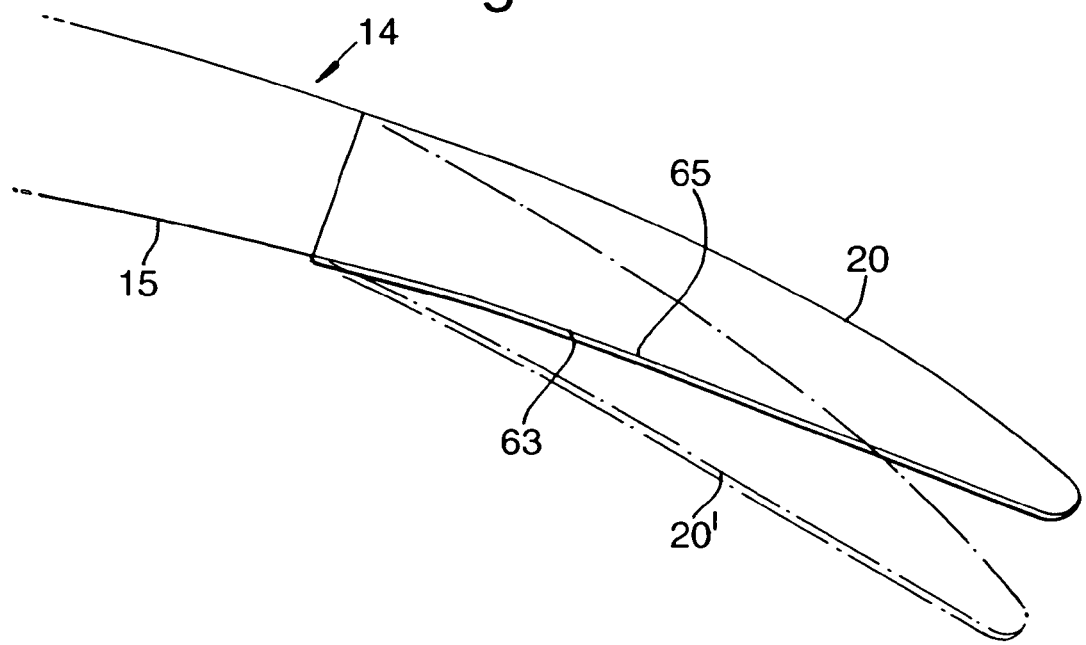
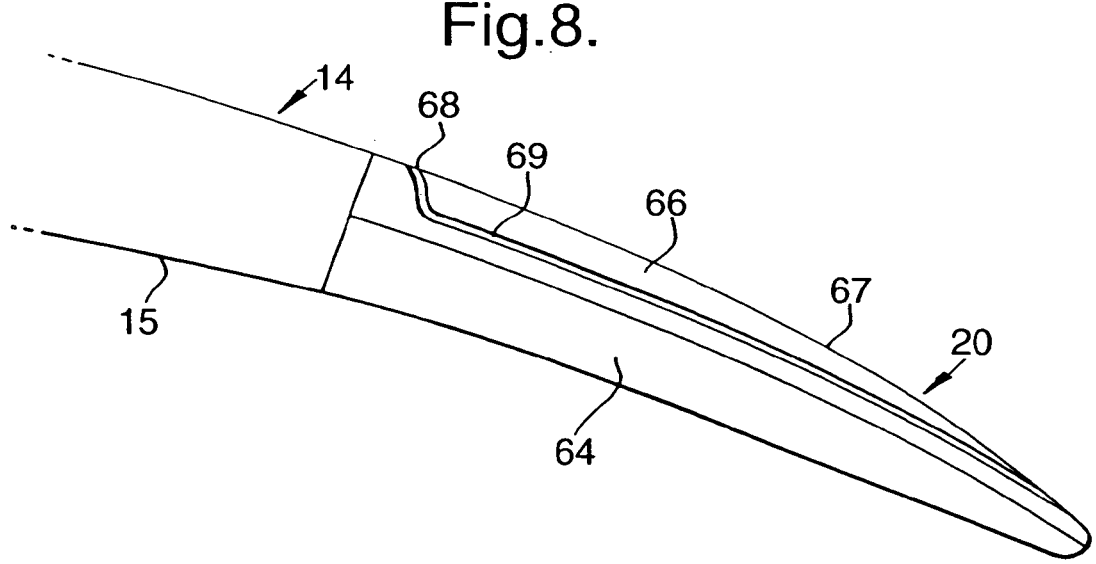

GAS TURBINE ENGINE EXHAUST NOZZLE

This application is a Continuation-in-Part of U.S. patent application Ser. No. 10/950,551, filed Sep. 28, 2004, now U.S. Pat. No. 7,000,378 which claims priority to U.S. patent application Ser. No. 10/072,990, filed Feb. 12, 2002, now U.S. Pat. No. 6,813,877, issued Nov. 19, 2004, which claims priority to United Kingdom patent Appl'n No. 0105349.5, filed Mar. 3, 2001, the complete disclosures of which are incorporated herein by reference.

FIELD OF INVENTION

The present invention relates generally to gas turbine engine exhaust nozzles, and in particular to noise reduction and performance improvements to nozzle arrangements used for gas turbine engines suited to aircraft propulsion.

BACKGROUND

Gas turbine engines are widely used to power aircraft. As is well known, the engine basically provides propulsive power by generating a high velocity stream of gas which is exhausted rearwards through an exhaust nozzle. A single high velocity gas stream is produced by a turbojet gas turbine engine. More commonly nowadays however two streams, a core exhaust and a bypass exhaust, are generated by a ducted fan gas turbine engine or bypass gas turbine engine.

The high velocity gas stream produced by gas turbine engines generates a significant amount of noise, which is referred to as exhaust or jet noise. This noise is generated due to the high velocity of the exhaust stream, or streams, and the mixing of the streams with the surrounding atmosphere, and in the case of two streams, as the bypass and core streams mix. The degree of noise generated is determined by the velocity of the stream and how the streams mix as they exhaust through the exhaust nozzle.

Increasing environmental concerns require that the noise produced by gas turbine engines, and in particular aircraft gas turbine engines, is reduced and there has been considerable work carried out to reduce the noise produced by the mixing of the high velocity gas stream(s). A large number of various exhaust nozzle designs have been used and proposed to control and modify how the high velocity exhaust gas streams mix. With ducted fan gas turbine engines particular attention has been paid to the core stream and the mixing of the core and bypass exhaust streams. This is because the core stream velocity is considerably greater than the bypass stream and also the surrounding atmosphere and consequently the core exhaust stream generates a significant amount of the exhaust noise. Mixing of the core stream with the bypass stream has also been found to generate a significant proportion of the exhaust noise due to the difference in velocity of the core and bypass streams.

One common current exhaust nozzle design that is widely used is a lobed type nozzle which comprises a convoluted lobed core nozzle as known in the art. However, this adds considerable weight, drag, and cost to the installation and nowadays short bypass nozzles are favoured with which the lobed type core nozzles are less effective and are also more detrimental to the engine performance than when used on a long cowl arrangement.

An alternative nozzle design that is directed to reducing exhaust noise is proposed and described in GB 2,289,921. In this design, a number of circumferentially spaced notches, of various specified configurations, sizes, spacing and shapes, are provided in the downstream periphery of a generally circular core exhaust nozzle. Such a nozzle design is considerably simpler to manufacture than the conventional lobed designs. This prior proposal describes that the notches generate vortices in the exhaust streams. These vortices enhance and control the mixing of the core and bypass streams which it is claimed reduces the exhaust noise.

Model testing of nozzles similar to those described in GB 2,289,921 has shown that significant noise reduction and suppression can be achieved. However the parameters and details of the design proposed in GB 2,289,921 are not optimal and there is a continual desire to improve the nozzle design further.

A further design, and that of the present Assignee, is proposed in UK Application GB 0025727.9. This application discloses trapezoidal shaped tabs disposed to the axially rearward exhaust ducts of the bypass and core and which are inclined radially inward to impart vortices to the exhaust streams.

However, the main requirement of reducing exhaust noise is during aircraft take-off and landing. At higher altitudes where the majority of the duration of the flight is, exhaust noise is not a problem. It is therefore not necessary to have noise reduction means operational at higher altitudes especially when one considers the noise reduction means inherently introduces aerodynamic inefficiencies.

The use of shape memory materials ("SMMs") to achieve movement in engineering applications has been known since at least the 1970s. SMMs are a class of materials that exhibit large changes in property over a relatively small temperature range (or ranges) and are generally stable at other temperatures. The most common is currently a Binary Nickel Titanium alloy, which is often used in a ternary state when Copper, Hafnium or Palladium is added. Other metal systems are known, such as those based on Copper or Iron. Certain Ceramics and polymers also exhibit similar properties. The majority are reversible, i.e. the properties return to original conditions on returning to the original temperature, although hysteresis is often present. Some are non-reversible, i.e, once the change with temperature has occurred, they do not return to their original condition. Systems that use triggers other than temperature are also known, for example magnetic (in magnetic (or ferromagnetic) shape memory alloys (MSM/FSM)), chemical, and light.

On heating through a pre-determined temperature range, the SMM undergoes a phase change. This is manifested as a change in properties. In its simplest form, a material can be "plastically" deformed when cold and will recover to its original state on heating. If an external load, such as a spring, is applied, the change in properties is conventionally considered a change in modulus of the material. When acting against the spring or load, the change in modulus leads to two equilibrium positions as the compression expansion of the SMM changes. More than two conditions could be useful, but suitable materials are not currently known.

The vast majority of applications and research have used SMM wires or thin strips attached to or embedded within a structure. The use of discrete wires severely limits the volume of material which can be utilised, which limits the total energy that can be expended and the integrity of the structure. Intimate contact between the SMA and parent structure (as in U.S. Pat. No. 6,718,752) severely limits the overall strain that can be achieved because the parent engineering material preferably is subject to a strain similar to that of the SMM. The optimum strain for current SMMs is around 2% whereas conventional structural materials must work below around 0.3% strain. This leads to severe compromises between the deflection that can be achieved and the stiffness of the structure as it opposes external (operational) loads. To achieve large deflections it must be thin, but this results in a low stiffness such that the SMM can be bent easily by external loads such as air, liquid etc. The choice must be made between either low stiffness and high deflection or high stiffness and low deflection.

SUMMARY OF INVENTION

It is therefore desirable and is an object of the present invention to provide an improved gas turbine engine exhaust nozzle which is quieter than conventional exhaust nozzles and/or which offers improvements generally.

Another object of the present invention is to provide a high stiffness and high deflection mechanism that uses SMM's, which can be designed to operate substantially in bending against external loads and is also inherently robust and lightweight.

According to a first aspect of the present invention there is provided a gas turbine engine exhaust nozzle arrangement for the flow of exhaust gases therethrough between an upstream end and a downstream end thereof comprising a nozzle, a downstream portion and a plurality of tabs, each tab extends in a generally axial direction from the downstream portion of the nozzle wherein the nozzle further comprises an actuation mechanism capable of moving the tabs between a first deployed position, in the first position the tabs interact with a gas stream to reduce exhaust noise thereof, and a second non-deployed position, in the second position the tabs are substantially aerodynamically unobtrusive.

Preferably, the plurality of tabs is circumferentially disposed about the nozzle.

Preferably, the actuation mechanism comprises a shape memory material element.

Preferably, the nozzle further comprises a radially inner position and a radially outer part, wherein the tabs are rotatably attached to the nozzle at the radially inner position, the actuation mechanism comprises the shape memory element mounted at a first end to a radially outer part of the nozzle and mounted at a distal end to a radially outer part of the tab, such that in use, the element in a first shape maintains the tab in the second non-deployed position and in a second shape maintains the tab in the first deployed position.

Preferably, the periphery of the nozzle defines a pocket therein and at least a part of the element is generally disposed within the pocket.

Preferably, the tab defines a recess therein and at least a part of the element is generally disposed within the recess.

Alternatively, the element is in the form of a spring.

Preferably, the nozzle arrangement comprises a resilient member having a first end and a distal end, the resilient member is attached at the first end to the tab and at the distal end to the nozzle and is arranged to provide a returning force to the tab.

Preferably, the nozzle defines an orifice and a passage, the orifice is exposed to a gas stream and the passage extends from the orifice to the pocket and thereby provides a conduit for transmitting the thermal flux of the gas stream to the actuation mechanism.

Alternatively, the tab comprises shape memory material and the tab further comprises a flexural element, the flexural element, in use, is arranged to provide a returning force to the tab.

Preferably, the tab defines an orifice, the orifice exposed to a gas stream, and a passage, the passage extending from the orifice, to the shape memory material and thereby provides a conduit for rapidly transmitting changes in the thermal flux of the gas stream to and throughout the memory shape material element.

Preferably, the actuation mechanism is actuated in a response to an applied field and the field is a temperature flux. Alternatively, the field is an electric current.

Preferably, the temperature flux is provided by the gas stream and the gas stream is any one chosen from the group comprising an ambient gas flow, a bypass flow, a core flow.

Preferably, the shape memory material element comprises any one of a group comprising Titanium, Manganese, Iron, Aluminium, Silicon, Nickel, Copper, Zinc, Silver, Cadmium, Indium, Tin, Lead, Thallium, Platinum.

Alternatively, the shape memory material element comprises an electrostrictive material and the actuation mechanism further comprises an electrical circuit, the electrical circuit comprising control apparatus, an electric generating means and electrical contact means, the electrical contact means arranged to deliver, in use, an electrical signal, generated by the electrical generating means, through the electrostrictive material, the control apparatus operable to control the electrical signal. Alternatively, the control apparatus is operated to deliver the electrical signal to the electrostrictive material, thereby actuating the electrostrictive material, the tab is moved from a second non-deployed position and a first deployed position and when the control means is operated so as not to deliver the electrical signal the electrostrictive material moves the tab between the first deployed position and the second non-deployed position.

Preferably, when the control apparatus is operated to deliver the electrical signal to the electrostrictive material, thereby actuating the electrostrictive material, the tab is moved between a first deployed position and a second non-deployed position and when the control means is operated so as not to deliver the electrical signal the electrostrictive material the tab is moved from the second non-deployed position and the first deployed position. Furthermore, the control apparatus, operable to control the electrical signal, is operated in response to the altitude of an associated aircraft.

Preferably, the electrostrictive material element comprises any one of a group comprising Lead Zirconate Titanate, Lead Magnesium Niobate and Strontium Titanate.

Alternatively, the electrostrictive material element comprises any one of a polymer group including polyvinylidene fluoride.

Preferably, the downstream portion of the nozzle comprises a downstream periphery, the plurality of circumferentially disposed tabs extend in a generally downstream direction from the downstream periphery.

Preferably, the downstream portion of the nozzle defines a plurality of circumferentially disposed recesses, each recess receiving a tab and when the tab is in a second non-deployed position it substantially occupies a recess.

Alternatively, the tabs comprise a thermal barrier coating disposed to a surface thereof.

Alternatively, the nozzle comprises a thermal barrier coating disposed to a surface thereof.

Preferably, the tabs circumferentially taper in the downstream direction and the tabs are radially inwardly angled at an angle of up to 20° relative to the nozzle wall.

Alternatively, the tabs are radially outwardly angled at an angle of up to 20° relative to the nozzle wall.

Furthermore, the tabs are circumferentially alternately radially inwardly angled at an angle of up to 20° relative to the nozzle wall and radially outwardly angled at an angle of up to 20° relative to the nozzle wall.

Preferably, the tabs are of a substantially trapezoidal shape but alternatively, the general shape of the tabs is any one of the groups comprising rectangular, square and triangular shape.

Preferably, the tabs are circumferentially disposed about the periphery of the nozzle wall to define substantially trapezoidal shaped notches between adjacent tabs. Alternatively, the tabs are circumferentially disposed about the periphery of the nozzle wall to define substantially V-shaped notches between adjacent tabs.

Alternatively, the edges of the tabs are curved.

Preferably, the nozzle tabs are radially inwardly angled at an angle of up to 10° relative to the nozzle wall.

Alternatively, the tabs extend in circumferentially alternating radially inward and outward directions for mixing the exhaust gas streams.

Alternatively, the actuation mechanism comprises the shape memory element spanning between each circumferentially adjacent deployable tab, the shape memory element having a first length and a second length, so that in use, when the shape memory element is in its first shape the deployable tabs are in the first deployed position and when the shape memory element is in its second shape the deployable tabs are in the second non-deployed position.

Preferably, the first length of the shape memory element is longer than the second length, so that in use and in the first deployed position the deployable tabs are angled radially outwardly.

Preferably, the first length of the shape memory element is shorter than the second length, so that in use and in the first deployed position the deployable tabs are angled radially inwardly.

Alternatively, in use as a noise reduction means, alternate tabs are rigidly fixed at a radially inward angle and deployable tabs are operable to move between a first deployed position at a radially outward angle, where the deployable tabs interact with a gas stream to reduce exhaust noise thereof, and a second non-deployed position, where the deployable tabs are substantially circumferentially aligned with the alternate tabs.

Alternatively, in use as a noise reduction means, alternate tabs are rigidly fixed at a second non-deployed position and deployable tabs are operable to move between a first deployed position at a radially inward angle, where the deployable tabs interact with a gas stream to reduce exhaust noise thereof, and a second non-deployed position, where the deployable tabs are substantially circumferentially aligned with the alternate tabs.

Preferably, the downstream periphery comprises straight edges, each straight edge having a tab disposed thereto.

Preferably, the actuation mechanism further comprises an end stop, the end stop is configured to provide a positive locator for the tab in either its deployed or non-deployed positions.

Preferably, the exhaust nozzle is a core engine nozzle but alternatively the exhaust nozzle is a bypass exhaust nozzle and the arrangement may comprise a core exhaust nozzle and a bypass exhaust nozzle.

Alternatively, a ducted fan gas turbine engine exhaust nozzle arrangement comprises an outer bypass exhaust nozzle as described in the preceding paragraphs and comprises an inner core exhaust nozzle of a lobed mixer type.

Preferably, the ducted fan gas turbine engine exhaust nozzle arrangement comprises the downstream end of the bypass nozzle being further downstream than the downstream periphery of the core exhaust nozzle. Alternatively, the downstream end of the bypass nozzle is upstream of the downstream periphery of the core exhaust nozzle.

Preferably, the engine exhaust nozzle arrangement is for exhaust noise attenuation.

Preferably, the tabs extend generally in a downstream direction but alternatively the tabs extend generally in an upstream direction.

According to a second aspect of the present invention there is provided a method of operating an aircraft having a gas turbine engine comprising an exhaust nozzle arrangement as claimed in any preceding claim wherein the method comprises the steps of: deploying noise reduction means prior to take-off; not deploying noise reduction means above a predetermined aircraft altitude and; deploying the noise reduction means below the predetermined aircraft altitude.

BRIEF DESCRIPTION OF THE DRAWINGS

FIG. 5 is a section through the part of the core nozzle and shows a first embodiment of the present invention, the nozzle comprising a first actuation mechanism for deploying the tabs;

FIG. 6 is a section through the part of the core nozzle and shows a second embodiment of the present invention, the nozzle comprising a second actuation mechanism for deploying the tabs;

FIG. 7 is a section through the part of the core nozzle and shows a third embodiment of the present invention, the nozzle comprising a third actuation mechanism for deploying the tabs;

FIG. 8 is a section through the part of the core nozzle and shows a forth embodiment of the present invention, the nozzle comprising a fourth mechanism for deploying the tabs;

DETAILED DESCRIPTION OF PREFERRED EMBODIMENTS

Figure 1:
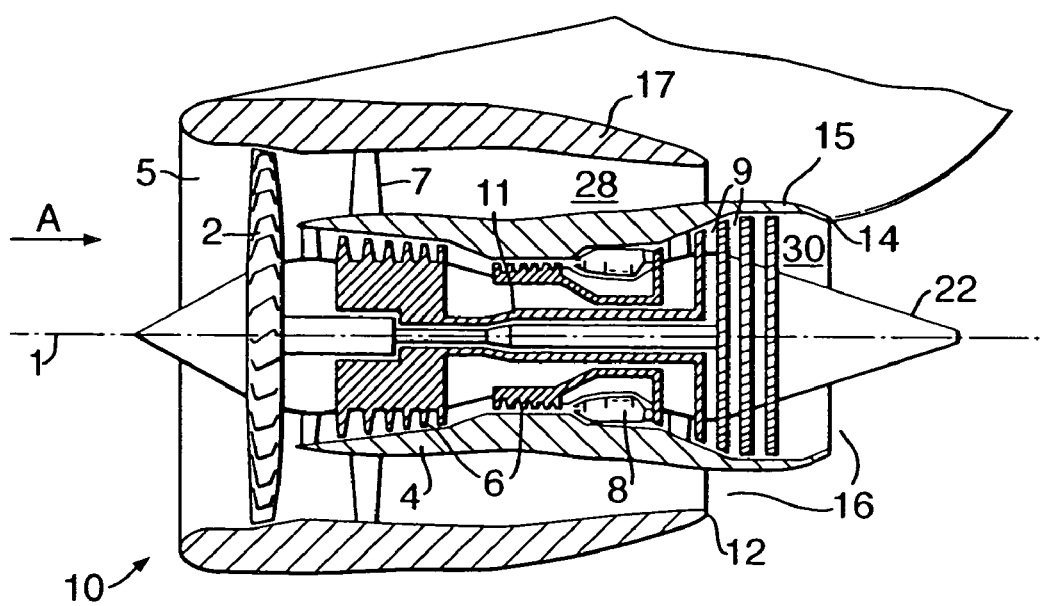
FIG. 1 is a schematic section of a ducted fan gas turbine engine incorporating an exhaust nozzle assembly, which itself comprises deployable noise reduction means in accordance with the present invention.

The present invention will now be described by way of example with reference to the figures. With reference to FIG. 1, a ducted fan gas turbine engine 10 incorporates an exhaust nozzle 12, 14, in accordance with the present invention, which itself comprises deployable noise reduction means. A ducted fan gas turbine engine 10 comprises, in axial flow series an air intake 5, a propulsive fan 2, a core engine 4 and an exhaust nozzle assembly 16 all disposed about a central engine axis 1. The core engine 4 comprises, in axial flow series, a series of compressors 6, a combustor 8, and a series of turbines 9. The direction of airflow through the engine 10, in operation, is shown by arrow A and the terms upstream and downstream used throughout this description are used with reference to this general flow direction. Air is drawn in through the air intake 5 and is compressed and accelerated by the fan 2. The air from the fan 2 is split between a core engine 4 flow and a bypass flow. The core engine 4 flow enters core engine 4, flows through the core engine compressors 6 where it is further compressed, and into the combustor 8 where it is mixed with fuel which is supplied to, and burnt within the combustor 8. Combustion of the fuel with the compressed air from the compressors 6 generates a high energy and velocity gas stream which exits the combustor 8 and flows downstream through the turbines 9. As the high energy gas stream flows through the turbines 9 it rotates turbine rotors extracting energy from the gas stream which is used to drive the fan 2 and compressors 6 via engine shafts 11 which drivingly connect the turbine 9 rotors with the compressors 6 and fan 2. Having flowed through the turbines 9 the high energy gas stream from the combustor 8 still has a significant amount of energy and velocity and it is exhausted, as a core exhaust stream, through the engine exhaust nozzle assembly 16 to provide propulsive thrust. The remainder of the air from, and accelerated by, the fan 2 flows within a bypass duct 7 around the core engine 4. This bypass airflow, which has been accelerated by the fan 2, flows to the exhaust nozzle assembly 16 where it is exhausted, as a bypass exhaust stream to provide further, and in fact the majority of, the useful propulsive thrust.

The velocity of the bypass exhaust stream is significantly lower than that of the core exhaust stream. Turbulent mixing of the two exhaust streams in the region of, and downstream of, the exhaust nozzle assembly 16, as well as mixing of both streams with the ambient air surrounding and downstream of the exhaust nozzle assembly 16 generates a large component of the noise generated by the engine 10. This noise is known as exhaust or jet noise. Effective mixing and control of the mixing of the two exhaust streams with each other and the ambient air is required in order to reduce noise generated. The mixing and its control is effected by the exhaust nozzle assembly 16.

In the embodiment shown the exhaust nozzle assembly 16 comprises two generally concentric sections, namely a radially outer bypass exhaust nozzle 12 and an inner core exhaust nozzle 14. The core exhaust nozzle 14 is defined by a generally frusto-conical core nozzle wall 15. This defines the outer extent of an annular core exhaust duct 30 through which the core engine flow is exhausted from the core engine 4. The inner extent of the core exhaust duct 30 is defined by an engine plug structure 22.

Figure 2:
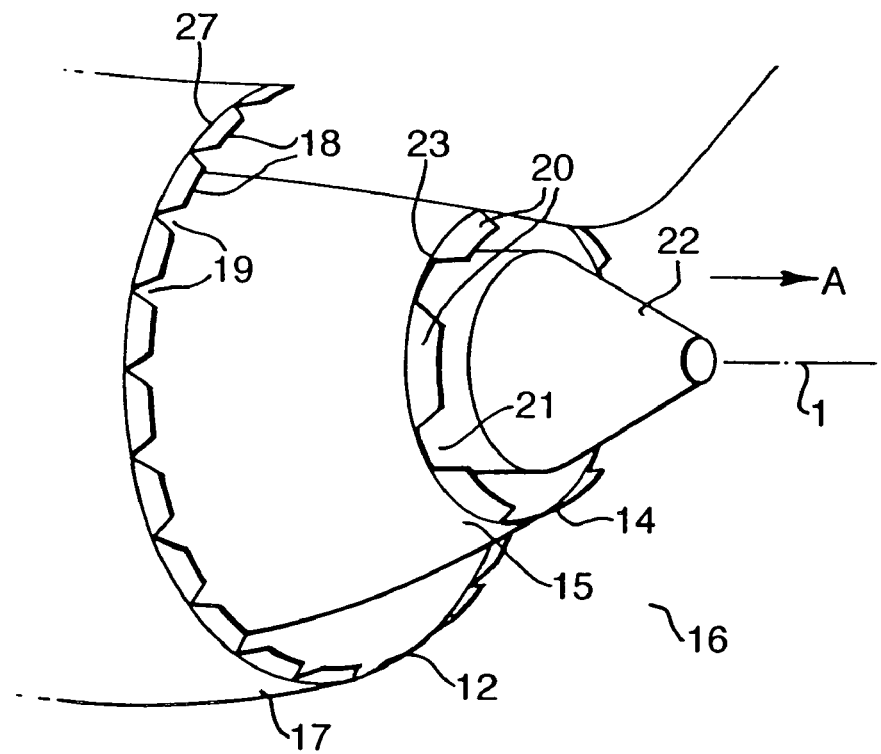
FIG. 2 is a more detailed schematic perspective view of the exhaust nozzle assembly, comprising deployable noise reduction means, of the ducted fan gas turbine engine shown in FIG. 1.

FIG. 2 is a more detailed schematic perspective view of the exhaust nozzle assembly 16, comprising deployable noise reduction means 18, 20, of a ducted fan gas turbine engine 10. FIG. 2 shows a similar configuration of noise reduction means 18, 20 as shown in UK Application GB 0025727.9, the present invention, however, relates to the exhaust nozzle having deployable noise reduction means 18, 20. It is intended that the deployable noise reduction means 18, 20 of the present invention operate in a similar manner and with the noise reduction advantages described in UK Application GB 0025727.9 when in a first deployed position. By way of example therefore, and as a preferred embodiment, the deployed tabs 18, 20 of the present invention are herein described with reference to the fixed noise reduction means of UK Application GB 0025727.9.

Referring again to FIG. 2, which shows a plurality of circumferentially spaced tabs 20 extending from the downstream periphery 23 of the core exhaust nozzle 14 and core nozzle walls 15. As shown, the tabs 20 are of a trapezoidal shape with the sides of the tabs 20 circumferentially tapering towards each other in the downstream direction. The tabs 20 are evenly and circumferentially disposed so that a notch 21 or space is defined by and between adjacent tabs 20. However, it is not intended to limit the spacing of the tabs 20 to being evenly distributed about the periphery 23 of the nozzle 14. The notches 21 are complimentary to the shape of the tab 20 and accordingly are of a trapezoidal shape on the core nozzle 14, with the notches 21 circumferentially opening out in a downstream direction.

The number of tabs 20, and so notches 21 defined in the core exhaust nozzle 14 and also bypass exhaust nozzle 12 (described below), the width of the notches 21, angle of the notches 21, width of notch 21, angular offset between notches 21, and angular gap between notches 21 are all essentially the same and within the same ranges as described in GB 2,289,921. It should be noted however that in GB 2,289,921 only the core nozzle 14 is provided with tabs 20 and notches 21 whereas, as described below, according to the present invention the downstream periphery 27 of the bypass exhaust nozzle 12 may also be provided with tabs 18 and thereby defined notches 19.

Figure 3:
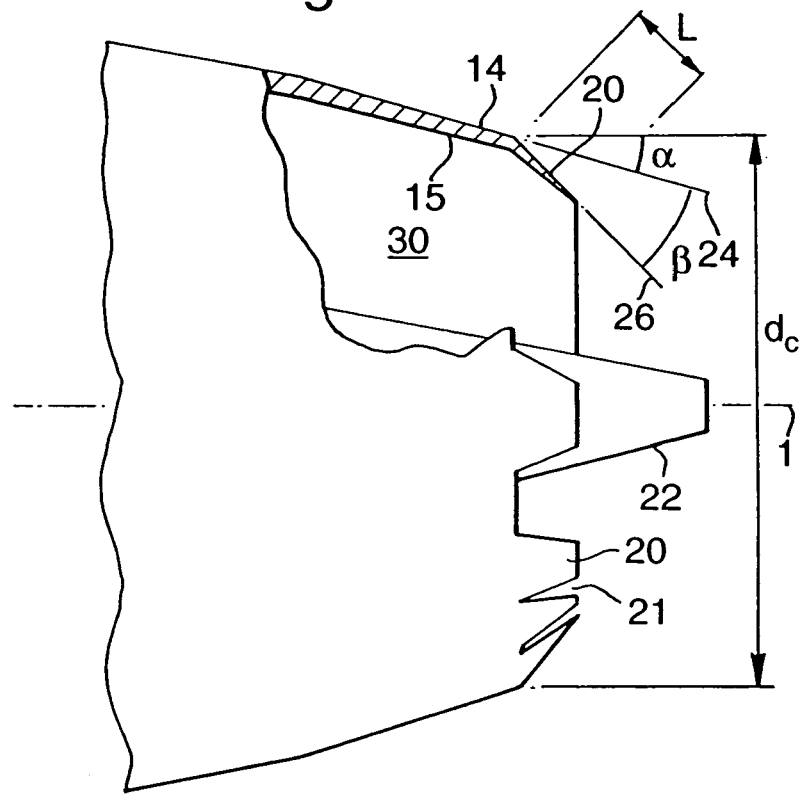
FIG. 3 is a part cutaway schematic view of the core exhaust nozzle, comprising deployable noise reduction means in a first deployed position, of the ducted fan gas turbine engine and exhaust nozzle shown in FIGS. 1 and 2.

Referring to FIG. 3 which is a part cutaway schematic view of the core exhaust nozzle, comprising deployable noise reduction means 18, 20 in a first deployed position, of the ducted fan gas turbine engine 10 and exhaust nozzle 14 shown in FIGS. 1 and 2. For simplicity, FIG. 3 and the description hereafter relates only to the present invention applied to the core exhaust nozzle 14, however the present invention may equally be applied to the bypass nozzle 12.

The tabs 20 of the core exhaust nozzle 14 are radially inwardly angled so that the tabs 20 impinge into the core duct 30 (relative to an extended line 24, shown in FIG. 3, of the profile of the core nozzle wall 15 immediately upstream of the tabs 20) and are, in operation, incident on the core exhaust flow which is exhausted through the core exhaust nozzle 14. The angle of incidence β of the tabs 20 is defined relative to an extended line 24 of the profile of the core exhaust nozzle wall 15 immediately upstream of the tabs 20. The profile of the core nozzle wall 15, immediately upstream of the tabs 20, itself is at an angle α (typically between 10° and 20°) to the engine axis 1.

It has been found that by angling the tabs 20, and the angle of incidence β, there is an effect on jet noise suppression. As the angle of incidence β is increased up to 20° the noise reductions are improved. However at angles of incidence β above 20° there is little further improvement in noise suppression. Furthermore at these higher angles of incidence β aerodynamic losses due to the effect the tabs 20 have on the core exhaust flow increase. Because of the aerodynamic losses at cruise the preferred embodiment of UK Application GB 0025727.9 comprises tabs 20 being angled at angles of incidence β up to 10°. For the present invention the tabs 20 may be preferably deployed at higher angles of incidence β, particularly at aircraft take-off and landing, as the tabs 20 may then be positioned in a second non-deployed position during aircraft cruise where the noise reduction means 20 are not required. The deployability of the tabs 20 is described in more detail hereinafter.

The tabs 20 and angling of the tabs 20 reduces the mid and low frequency noise generated by the exhaust and engine 10, typically in the frequency range 50-500 kHz. It does however, in some cases increase the noise generated at higher frequencies. The noise at low and mid frequencies though is the most critical in terms of the perceived noise level and the higher frequency noise is masked by noise generated from elsewhere in the engine 10. Therefore overall the tabs 20 provide a reduction in the perceived exhaust noise generated. The increase in high frequency noise sometimes associated with the angled tabs 20 at higher angles of incidence β is a further reason why the tabs 20 are preferably angled at angles of incidence β up to 10°.

The tabs 20 induce stream-wise vortices in the exhaust flow through and around the nozzle 14. These vortices are generated and shed from the sides of the tabs 20 and increase the local turbulence levels in a shear layer that develops between the core and bypass exhaust streams downstream of the exhaust nozzle assembly 16. This vorticity and turbulence increases and controls the rate of mixing between the core exhaust stream, bypass exhaust stream, and the ambient air. This mixing reduces the velocities downstream of the exhaust assembly 16, as compared to a conventional nozzle, and so reduces the mid to low frequency noise generated by the exhaust streams. The increased turbulence generated by the tabs 20 in the initial part of the shear layers immediately downstream of the exhaust nozzle assembly 16 causes an increase in the high frequency noise generated. Having tabs 20 angled radially inwards increases the strength of the vortices produced and so improves the reduction in perceived noise. However the angle of incidence β of the tabs 20 must not be too large since this can induce flow separation which will generate, rather than reduce the noise as well as adversely affecting aerodynamic performance of the nozzle 14.

The bypass exhaust nozzle 12 is also defined by a generally frusto-conical bypass nozzle wall 17 which is concentric with and disposed radially outwardly of the core exhaust nozzle 14. The bypass nozzle wall 17 defines the outer extent of an annular bypass exhaust duct 28 through which the bypass engine flow is exhausted from the engine 10. The inner extent of the bypass exhaust duct 28 is defined by an outer wall 15 of the core engine 4. The bypass nozzle 12 is similar to the core exhaust nozzle 14 and a plurality of circumferentially spaced tabs 18 extend from the downstream end of the bypass exhaust nozzle 12 and bypass nozzle walls 17. As with the core nozzle 14, the tabs 18 are of a trapezoidal shape with the sides of the tabs 18 circumferentially tapering in the downstream direction. The tabs 18 are evenly circumferentially disposed so that a V-shaped notch 19 or space is defined by and between adjacent tabs 18. The bypass nozzle tabs 18 affect the bypass exhaust flow and noise generated in a similar way to the core exhaust nozzle tabs 20.

The tabs 20 should have a length L sufficient to generate the required stream-wise vortices as described below and GB 2,289,921 specifies that the tabs 18,20 must have a length L of between 5% to 50% of the nozzle diameter Dc, Db. It has been found however that using long tabs, towards the 50% end of the range given, induces excessive aerodynamic losses which adversely affect the performance particularly when they are angled. Accordingly it has been determined that the core tabs 20 should have a length L of approximately 10% of the core exhaust nozzle diameter Dc, whilst the bypass tabs 18 should have a length L of approximately 5% of the bypass exhaust nozzle diameter Db. The bypass tabs 18 have a smaller percentage length since the bypass provides more of the propulsive thrust of the engine and so any performance loss on the bypass will have a greater effect on the overall engine performance. In addition although the percentage size is less, since the bypass is of a greater diameter than the core the actual physical size of the core tabs 20 and bypass tabs 20 are not so different.

In model tests of the exhaust nozzle assembly 16 shown in FIG. 2 and described above a 5 dB reduction in the peak sound pressure level over a conventional plain frusto conical nozzle arrangement has been achieved. It has also been found that the noise reductions provided by using tabs 18 on the bypass exhaust nozzle 12 and by using tabs 20 on the core exhaust nozzle 14 are cumulative. It will therefore be appreciated that in other embodiments tabs 18, 20 can be used on the bypass exhaust nozzle 12 or the core exhaust nozzle 14 alone to give some improved degree of noise suppression. The core exhaust nozzle tabs 20 and the bypass exhaust nozzle tabs 18 can also be angled at different angles of incidence β.

Whereas FIG. 3 and the description thereof are related to a preferred embodiment it is not intended that the present invention only relates to that preferred embodiment. For example, the deployable tabs 20 may be any shape and in particular may also be triangular, and the tabs 20 may be unevenly distributed about the periphery 23 of the nozzle 14. Similarly, the tabs 20 may be angled both radially inwardly and radially outwardly from the periphery 23 of the nozzle 14. It is also not intended that the tabs 20 must be straight, but may be curved in the plane of the paper on FIG. 3. Although the preferred embodiment the present invention is neither restricted to a particular angle of the tabs 20 nor their length L.

The present invention is however, concerned with having deployable noise reduction means. The term deployable meaning that the noise reduction means, in a first position, may be exposed to and interact with the gas stream(s) and be operable as noise reduction means and in a second position or suitable arrangement may be generally aligned with the gas stream(s) to be aerodynamically unobtrusive and therefore not operable as a noise reduction means. This second position is in order to reduce the aerodynamic drag when the aircraft is particularly at cruise and where the noise reduction means is not generally required.

Figure 4:
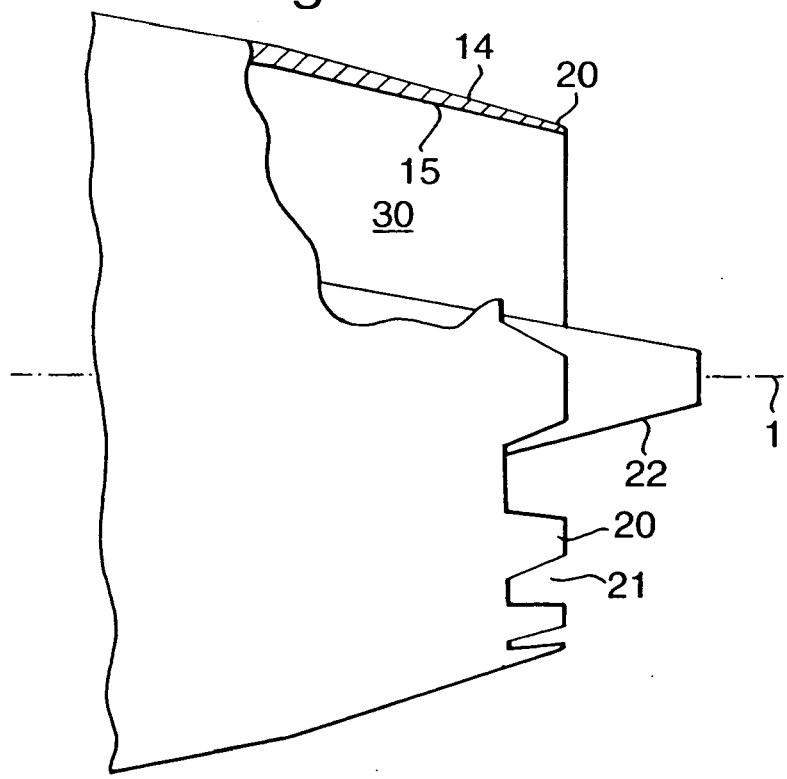
FIG. 4 is a part cutaway schematic view of the core exhaust nozzle, comprising deployable noise reduction means in a second non-deployed position, of the ducted fan gas turbine engine and exhaust nozzle shown in FIG. 3.

FIG. 4 is a part cutaway schematic view of the core exhaust nozzle 14, comprising deployable noise reduction means 20 in a second non-deployed position, of the ducted fan gas turbine engine 10 and exhaust nozzle 14 shown in FIG. 3. It is an object of the present invention to provide either the bypass nozzle 12 or the inner core exhaust nozzle 14 or both with deployable noise reduction means 20. The main requirement of reducing exhaust noise is during aircraft take-off and landing procedures. At higher altitudes where often the majority of the duration of the flight is, exhaust noise is not a problem. It is therefore not necessary to operate noise reduction means 20 at higher altitudes especially when one considers the noise reduction means 20 introduces aerodynamic inefficiencies. Thus, in FIG. 4, the tabs 20 are in a second non-deployed position, where they have been generally aligned with the nozzle wall 15 and thus also the gas stream and when they are not required for exhaust noise reduction. Although in FIG. 4 the tabs 20 are shown in general alignment with the nozzle wall 15, it is an object of the present invention to provide non-deployed tabs 20 which are aligned in the most aerodynamic position, which is not necessarily as shown on FIG. 4 for all embodiments of the present invention. It is also an object of the present invention to provide deployable tabs 20 or a mechanism for deploying the tabs 20, which is operable by means of the change in a field. The fields of particular relevance to the present invention are temperature flux, electrical current or magnetic flux. Thus it is the change or at least exposure to one of these types of field, which operate the control mechanism to at least deploy the tabs 20.

FIG. 5 shows a first embodiment of the present invention, the nozzle comprising a suitable mechanism for deploying the tabs 20. The deployable tabs 20 are shown in the second non-deployed position by the solid lines, where they are generally aligned with the nozzle wall 15 and therefore aligned generally with the exhausted gas stream, and in the first deployed position by the dashed tabs 20'. In the first deployed position the tabs 20' interact with the gas stream creating and shedding noise reducing vortices. The first mechanism 32 suitable for activating the tabs 20, 20' comprises a shape memory material (SMM) element 34, as known in the art, which is switchable from a first shape indicated as reference numeral 34 to a second shape indicated as reference numeral 34'. The SMA element 34 is disposed within or partly within a pocket 36 situated in the aft end of the nozzle wall 15 and a recess 38 in the tab 20. The SMM element 34 is secured by rotatable means 40, 42 to both the nozzle wall 15 and the tab 20 respectively. The first mechanism 32 also comprises the tab 20 being rotatably mounted to the nozzle wall 15 by further rotatable means 44.

In this first embodiment of the present invention the shape of the SMM element 34 is temperature sensitive. Below a predetermined temperature the SMM element 34 is designed to assume the first shape 34 and above the predetermined temperature the SMM element 34 assumes the second shape 34'. Essentially the SMM element 34 changes its length from the first shape 34 to the second shape 34' and thereby operates as an actuator mechanism for deploying the tabs 20. This temperature is known as the switch temperature and for the present invention a suitable switch temperature would be between the temperatures generally experienced at either take-off or landing, and that experienced at cruise. It is generally understood that temperature decreases with an increase in altitude and it is this temperature change that this first embodiment of the present invention seeks to utilise. Typically high altitude cruise temperatures may be between minus 25° C. to 40° C. and ground temperatures between minus 15° C. to plus 40° C. A suitable switch temperature or range of temperatures would be minus 15° C. to minus 25° C. Thus at take-off and landing the SMM element 34 would assume the second position, thereby deploying the tabs 20', and at cruise the SMM element 34' would assume the first position with the tabs 20 in the second non-deployed position.

Although this embodiment only shows one SMM element 34, more than one SMM element 34 may be disposed to each tab 20. Similarly, although in this embodiment the tabs 20 are rotatably mounted 44 at a radially inner position and the SMM element 34 mounted to the nozzle 14 and tabs 20 at a radially outer position (40, 42), it is equally feasible to interchange the inner mounting positions (44) with the outer mounting position (40, 42). Thus it is possible to operate the tab 20 in similar fashion or alternatively to deploy the tab in a radially outward direction.

It is preferable although not essential to provide an orifice 37 and a passage 39, both defined by the core nozzle 14, leading from the core duct 30 to the pocket 36. The orifice 37 is configured such that core exhaust gases may be channelled into the pocket 36 so that the SMM element 34 is subjected to the thermal output of the engine as quickly as possible, thereby the response of the SMM element 34 is relatively rapid.

The SMM element 34 may be manufactured from any, or any combination of the following materials; Titanium, Manganese, Iron, Aluminium, Silicon, Nickel, Copper, Zinc, Silver, Cadmium, Indium, Tin, Lead, Thallium, Platinum, polymers.

FIG. 6 is a section through part of the core nozzle 14 and shows a second embodiment of the present invention, the nozzle 14 comprising a second actuation mechanism 50 for deploying the tabs 20. The second actuation mechanism 50 is disposed within or partly within a pocket 36 situated in the aft end of the nozzle wall 15 and a recess 38 in the tab 20 and comprises a SMM spring element 52, in the general form of a helical spring, and a further, coaxial spring 54. The coaxial spring 54 comprises a conventional resilient material and which operates in a conventional manner. The SMM spring 52 may be secured by rotatable means 56, 58 to both the nozzle wall 15 and the tab 20 respectively. The second mechanism 50 also comprises the tab 20 being rotatably mounted to the nozzle wall 15 by further rotatable means 60.

The second embodiment of the present invention operates in a similar manner to the first embodiment in that the length of the SMM spring element 52 changes when its temperature is above or below a predetermined switchable temperature. In this embodiment the coaxial spring 54 is provided to give a returning force for the tabs 20 having been deployed. It is equally viable to use any resilient member capable of applying a returning force instead of the spring 54. The particular advantage of this embodiment is that the actuation mechanism may accommodate greater extensions while undergoing less strain than the SMM element 34 described with reference to the first embodiment.

Although this second embodiment of the present invention describes the use of a single SMM spring element 52 and spring 54 more than one of each may be used. The SMM spring element 52 and spring 54 may also be arranged other than coaxially.

FIG. 6 also shows a duct 62 formed in the nozzle wall 15, which is so arranged to provide the actuation mechanism 50 with a flow of gas. In this embodiment, where the actuation mechanism is arranged to give a greater extent of actuation, it is advantageous to provide the actuation mechanism 50 with cooler exhaust gas ducted from the bypass gas stream rather than the core exhaust gas stream, the bypass stream temperature being more representative of the ambient air temperature and thus better suited to providing a more defined switchable temperature. In general the ambient temperature near to and on the ground is warmer than at altitude. Thus the tabs 20 may be conveniently calibrated to the relative difference in these ambient temperatures at different altitudes. However, this does not discount using the core gas stream flow to control the temperature of the SMM. Using the core gas flow to control the temperature of the SMM has an advantage in that its temperature is not dependant on the ambient air temperature, but instead is dependant on the engine operation cycle. At take-off, the engines are working at near maximum capacity and the core exhaust gas is at its hottest, whereas at cruise there is a reduction in the core exhaust gas temperature.

FIG. 7 is a section through the part of the core nozzle 14 and shows a third embodiment of the present invention, the nozzle comprising a third actuation mechanism for deploying the tabs 20. The deployable tabs 20 are shown in the second non-deployed position by the solid lines, where they are generally aligned with the nozzle wall 15 and therefore aligned generally with the exhausted gas stream, and in the first deployed position by the dashed tabs 20'. In the first deployed position the tabs 20' interact with the gas stream generating and shedding noise-reducing vortices.

In this third embodiment of the present invention the tabs 20 themselves are manufactured from SMM thus the tabs themselves are the actuation mechanism. The tab 20 is disposed to the periphery of the nozzle 14 and generally extends in the rearward direction therefrom. Again above the switch temperature the SMM tab 20' will be in the first deployed position and below the switch temperature the SMM tab 20 will be in the second non-deployed position.

Where the thermal cycle of the bypass exhaust gas is utilised to actuate the SMM element 66, a thermal barrier coating 63 is be applied to the radially inner surface 65 of the tab 20 to provide thermal insulation from the core exhaust gases.

FIG. 8 is a section through the part of the core nozzle and shows a forth embodiment of the present invention, the nozzle comprising a fourth mechanism for deploying the tabs. The fourth actuation mechanism comprises a tab 20, disposed to the aft periphery of the nozzle wall 15, including a flexural element 64 and a SMM element 66. The flexural element 64 and SMM element 66 essentially make up radially inner and outer portions of the tab 20 respectively, the tabs being of general configuration as hereinbefore described. This fourth embodiment operates in a similar manner to the third embodiment, except that the flexural element 64 provides a returning force to the tab 20, the tab 20 having been deployed. The flexural element 64 helps to prevent hysteresis of the SMM element 64 and may itself comprise any suitable resilient material such as titanium.

With particular reference to the present embodiment, and that described with reference to FIG. 7, where the tabs 20 are disposed to the periphery of the core nozzle 14 and therefore subject to high temperatures, it is a further advantage for the flexural element 64 to comprise a material which is either heat resistant or generally does not conduct heat to the SMM element 64. Alternatively, where the thermal cycle of the bypass exhaust gas is utilised to actuate the SMM element 66, a thermal barrier coating (as shown on FIG. 7) may be applied to the radially inner surface of the tab 20 to provide thermal insulation from the core exhaust gases.

It is preferable, although not essential, to provide the shape memory material element 64 with means to quickly respond to a change in gas temperature. One such way is to shown in FIG. 8 where the tab 20 defines an orifice 68 which is exposed to a gas stream, and a passage 69 which extends from the orifice 68 to the shape memory material element 66 and thereby provides a conduit for quickly transmitting changes in the thermal flux of the gas stream to and throughout the memory shape material element 66. In this embodiment, where the nozzle 14 is the core nozzle 14, it is preferred to dispose the orifice 68 to the radially outer surface 67 of the tab 20 thereby utilising the bypass gas flow for the purposes of actuating the shape memory material element 64.

Another such way of providing the shape memory material element 64 with the means to quickly respond to a change in gas temperature is to use fins (not shown), which extend outward from the surfaces of the tab 20 and thereby provide an increased surface area for improved thermal transfer. Alternatively, channels (not shown) may be defined by the tab 20 so as to increase the surface area of the tab 20.

Figure 9:
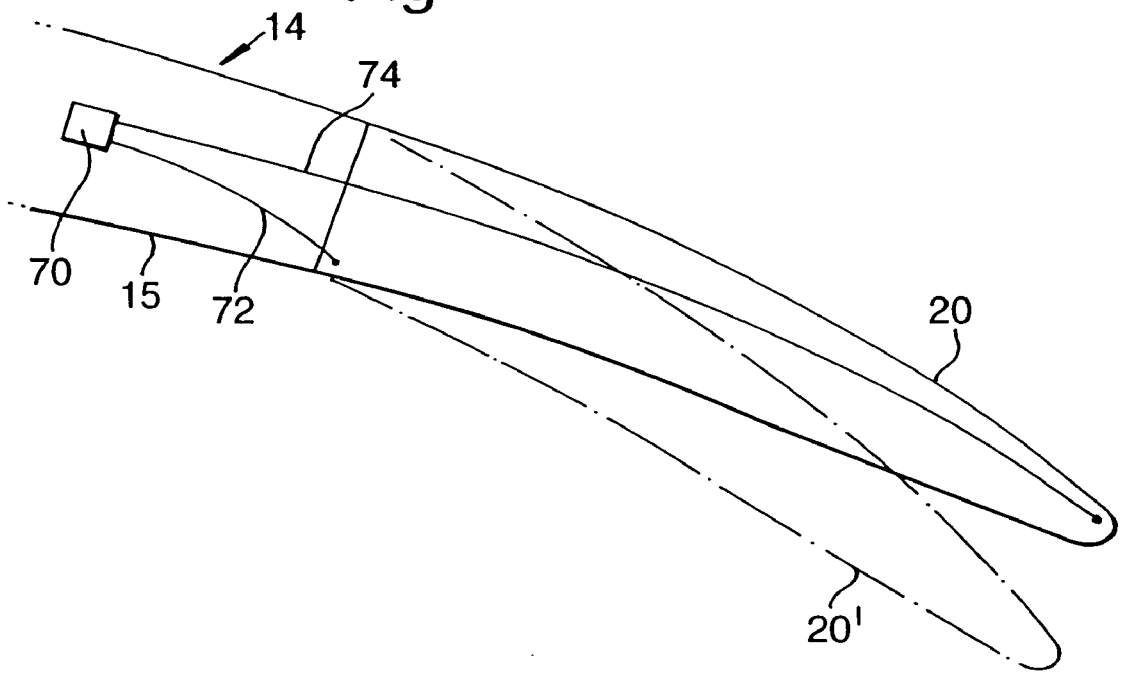
FIG. 9 is a section through the part of the core nozzle and shows a fifth embodiment of the present invention, the nozzle comprising a fifth mechanism for deploying the tabs.

Referring now to FIG. 9, which is a section through the part of the core nozzle and shows a fifth embodiment of the present invention, the nozzle comprising a fifth mechanism for deploying the tabs. In this fifth embodiment the tabs 20 comprise electrostrictive material. The tabs 20 are connected via leads 72 and 74 to an electrical supply 70, which are configured to apply an electrical current through the tab 20. Thereby, on application of an electric current, the tab 20 displaces to the shape of tab 20', where the tab 20 is in the first deployed position. Removal of the electric current returns the tab 20 from the first deployed position (20') to the second non-deployed position (20).

For the purposes of the present invention the term 'shape memory material' comprises the thermally responsive materials already mentioned herein as well as electrostrictive materials and magnetostrictive materials. The electrostrictive material may typically comprise lead zirconate titanate, lead magnesium niobate or strontium titanate. Alternatively, the electrostrictive material may be in the form of a polymer such as polyvinylidene fluoride. Furthermore, magnetostrictive materials may be used having similar properties to electrostrictive material. Suitable magnetostrictive materials include Titanium, Manganese, Iron, Aluminium, Silicon, Nickel, Copper, Zinc, Silver, Cadmium, Indium, Tin, Lead, Thallium, Platinum. Although the amount of magnetostriction is usually small, it has been shown (Clark, A. E., "Magnetostrictive rare earth-$Fe_2$ compounds", Ferromagnetic Materials, Vol. 1, Ch. 7, North Holland Publishing Co., 1980) that considerable magnetostriction in an alloy of Terbium, Dysprosium and Iron, which is commercially known as Terfenol-D™, is possible. Terfenol-D™ comprises approximately 30% Terbium and 70% Dysprosium and also traces of Iron.

It is intended that the electric current be applied by a control switch which itself is dependant on an engine or aircraft condition or mode of operation. For example and which is also a preferred embodiment, the control of the electrical current is dependent on the altitude of the aircraft. Thus below a predetermined altitude there is no electric current supplied to the tabs 20', which are in the first deployed position. Above the predetermined altitude the electric current is switched on and supplied to the tabs 20 which are then driven into their second non-deployed position. Alternatively, the tabs 20 may be disposed in their second non-deployed position when there is no supply of electric current. On start up of the engine an electric current is thereby supplied to the tabs 20' to deploy them. Then on reaching the predetermined altitude the electric current to the tabs 20' is cut off and the tabs 20 return to their second non-deployed position.

Figure 10:
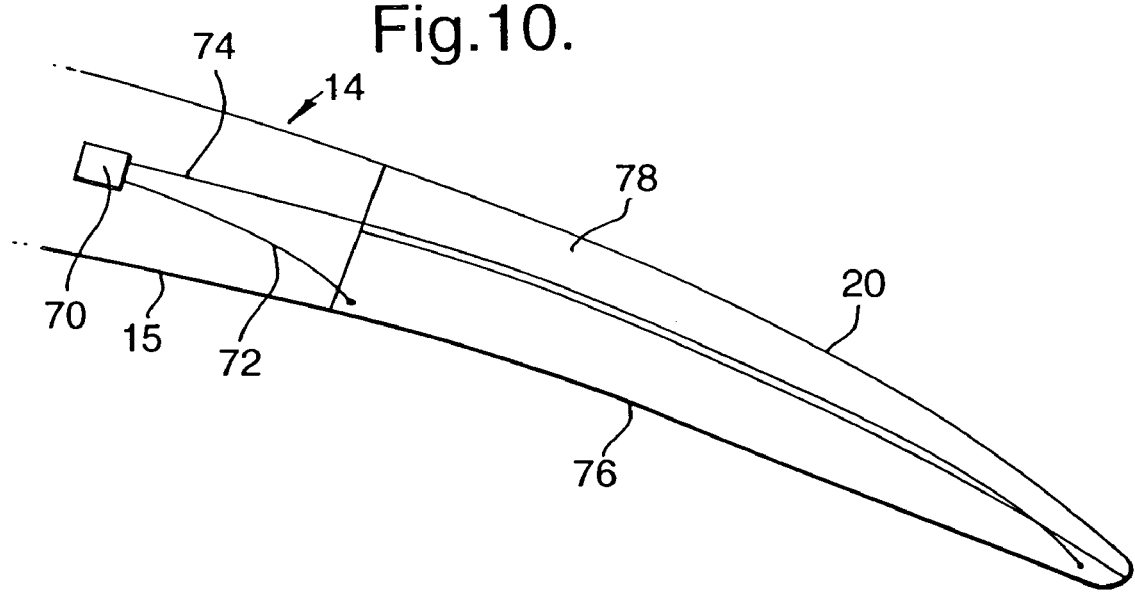
FIG. 10 is a section through the part of the core nozzle and shows a sixth embodiment of the present invention, the nozzle comprising a sixth mechanism for deploying the tabs.

FIG. 10 is a section through part of the core nozzle 15 and shows a sixth embodiment of the present invention, the nozzle 15 comprising a sixth mechanism for deploying the tabs. Similar to the fourth embodiment of the present invention the tabs 20 comprise an electrostrictive element 76 and a flexural element 78. The flexural element 78 provides a returning force to the tab 20 after the tab 20 has been deployed and the electrical supply has been removed. The flexural element 78 helps to prevent hysteresis of the tab 20 and may itself comprise any suitable resilient material such as titanium.

Figure 11:
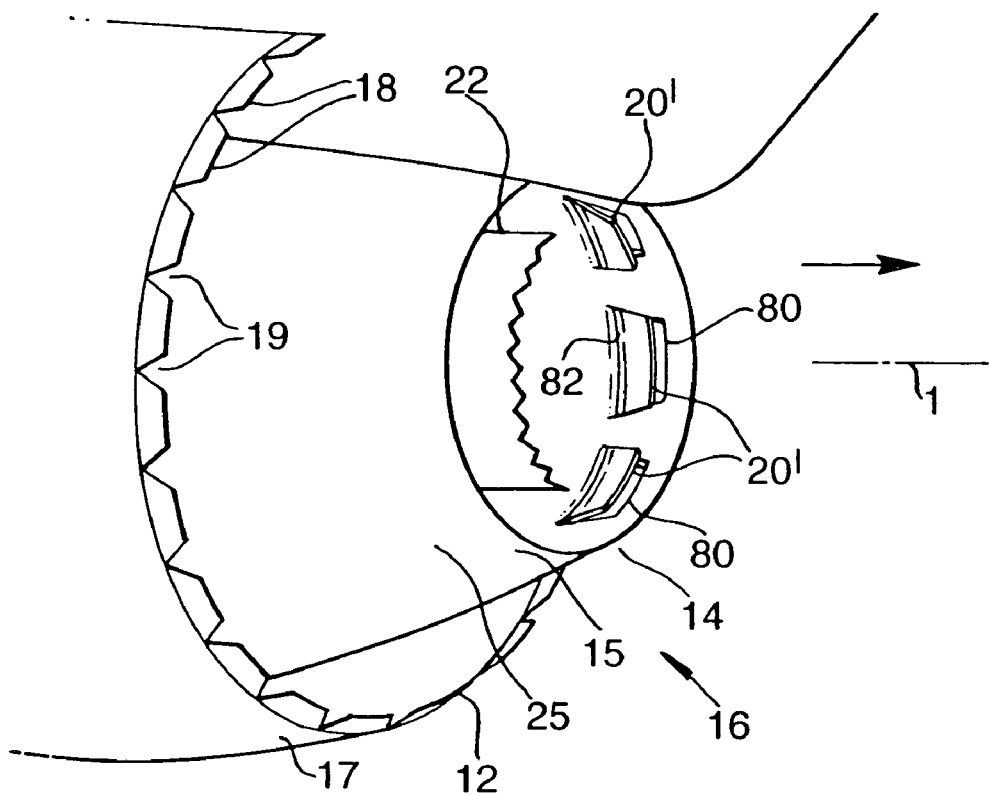
FIG. 11 is a more detailed schematic perspective view of the exhaust nozzle assembly, comprising a seventh embodiment of the deployable noise reduction means, of a ducted fan gas turbine engine.

With reference to FIG. 11, which is a more detailed schematic perspective view of the exhaust nozzle, comprising a seventh embodiment of the deployable noise reduction means, of a ducted fan gas turbine engine. For clarity the core plug 22 is not shown. Although the present invention has been described hereinbefore with reference to the tabs 20 or noise reduction means being disposed to the downstream periphery 23 of a nozzle wall 15, 17 is should be noted that any of the noise reduction means, herein described, may be easily adapted to be disposed substantially within the core or bypass nozzle walls 15, 17. For this alternative embodiment of the present invention, non-deployed tabs 20 are disposed within recesses 80 in a rearward portion 27 of the nozzle wall 15 to form an aerodynamically smooth gas-washed surface and deployed tabs 20' (as shown in FIG. 11) project radially inward from the nozzle wall 15. The upstream edge portion 82 of the tabs 20 is attached to the nozzle wall 15. In the first deployed position the tabs 20' generate the noise reducing vortices as described hereinbefore. In addition, this embodiment may also comprise the tabs 20 being disposed to the radially outer side of the core nozzle wall 15 and to the radially inner and outer sides of the bypass nozzle wall 15 or in any combination of the radially inner and outer side of either the core or bypass nozzles 15, 17.

Figure 12:
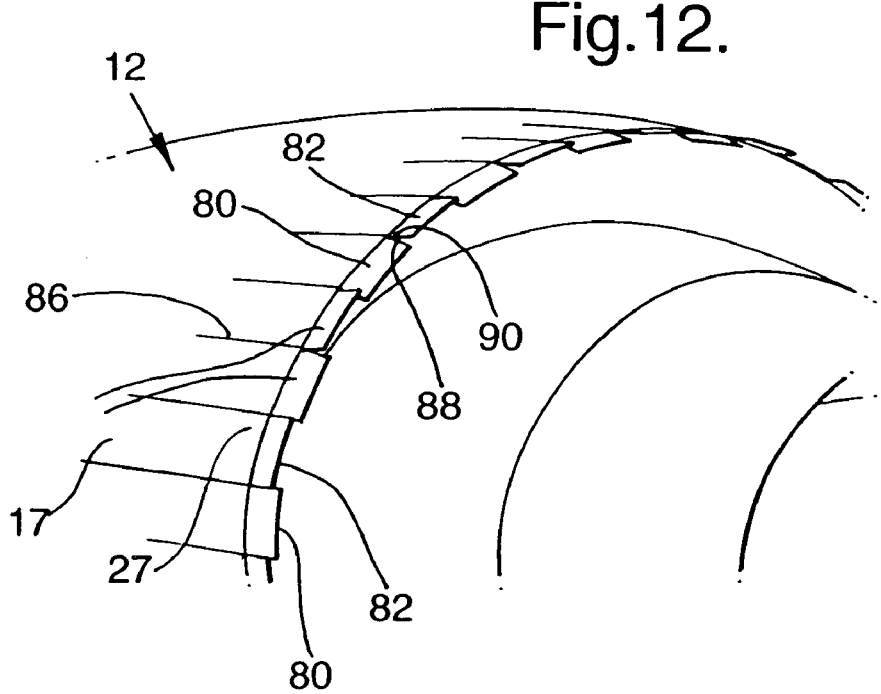
FIG. 12 is a schematic perspective view of the exhaust nozzle assembly, comprising an eighth embodiment of the deployable noise reduction means, of a ducted fan gas turbine engine.
Figure 13:
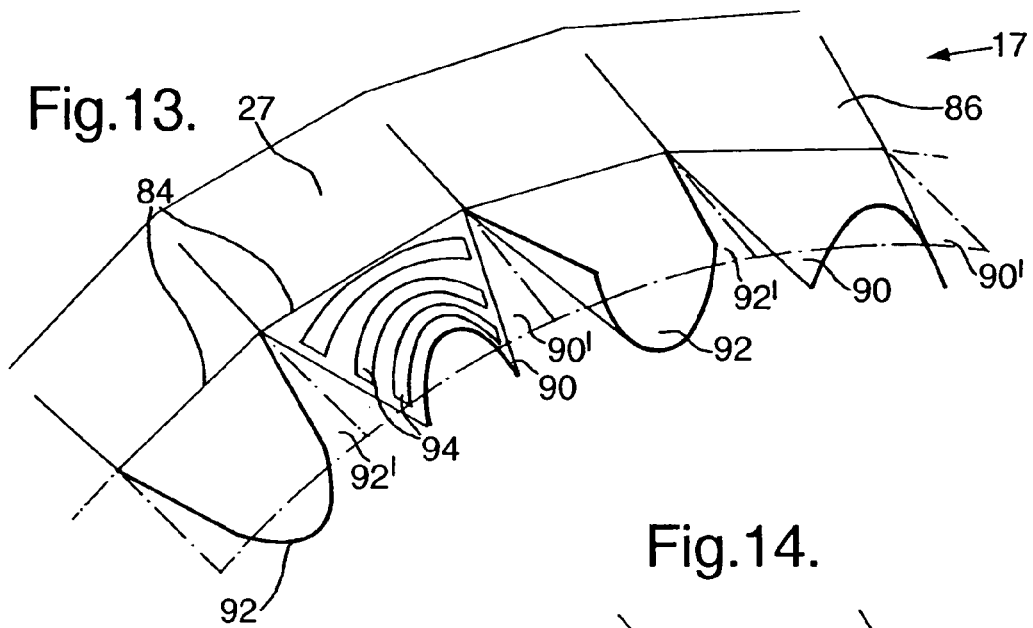
FIG. 13 is a schematic perspective view of the exhaust nozzle assembly, comprising a ninth embodiment of the deployable noise reduction means, of a ducted fan gas turbine engine.

Referring now to FIG. 12, circumferentially alternate tabs 80, 82 are radially inwardly and outwardly angled relative to the bypass exhaust nozzle 12 as hereinbefore described. The bypass nozzle wall 17, which defines the bypass exhaust nozzle 12, also defines the downstream periphery 27. In this embodiment the bypass nozzle wall 17, which is generally circular, comprises a transition portion 86 having the downstream periphery 27 comprising straight edges 84. The transition portion 86 is where the nozzle wall 17 blends out from a substantially smooth circular section to form the straight edges 84. Each straight edge 84 is of a length suited to accommodate at least one tab 80, 82. The tabs 80, 82 comprise shape memory material and operate in a manner described hereinbefore. SMM tabs that are curved to match the curvature of a smooth circular periphery, as shown with reference to FIG. 2 et al, have to overcome stiffness inherent with a curved shape. It is therefore an advantage to have straight edges 84 which enable the tabs 80, 82 to be substantially flat and, in operation act as a noise reduction means, this allows the tabs 80, 82 to flex more easily between the non-deployed position and the deployed position.

During take-off and climb of the aircraft, when the tabs 80, 82 are intended to be deployed as noise reduction means (shown in FIG. 12), the combination of the radially inwardly and outwardly angled tabs 80, 82 counteracts the effect of the area of the nozzle being reduced where solely radially inwardly angled tabs are used. Radially outwardly angling the tabs 82 effectively enlarges the nozzle 12 exit area. This is particularly advantageous as the gas flow through the engine 10 is unaffected by the deployment of the noise reduction means 80, 82 and therefore the operation of the fan 2 remains stable.

At aircraft cruise conditions where the noise reduction means is not required, the tabs 80, 82 are aligned with the profile of the nozzle 12 to provide the least possible disturbance to gas flow. This particular configuration of tabs 80, 82 lends itself to providing a good aerodynamic airwash surface as edges 88, 90 of adjacent tabs 80, 82 abut one another. The edges 88, 90 may be provided with sealing means (not shown) and/or profiled to interlock with one another to prevent gas leakage therethrough when in the non-deployed position.

In a further embodiment the tabs 80 are rigidly fixed in a deployed position as shown in FIG. 12. The tabs 82 comprise shape memory material and are moveable between a deployed position as shown in FIG. 12 and a non-deployed position, where they are circumferentially aligned with tabs 80. This is advantageous as during take-off and climb the tabs 82 are deployed for noise reduction and the exit area of the nozzle 12 is enlarged. This enlargement reduces the velocity of the gas stream issuing from the bypass duct 12 that intrinsically reduces exhaust noise. At aircraft cruise the tabs 82 are in the non-deployed position, where the edges 88, 90 are in sealing engagement with one another, and the exit area is therefore reduced. This reduction increases the velocity of the exhaust gas stream and improves engine efficiency.

Figure 14:
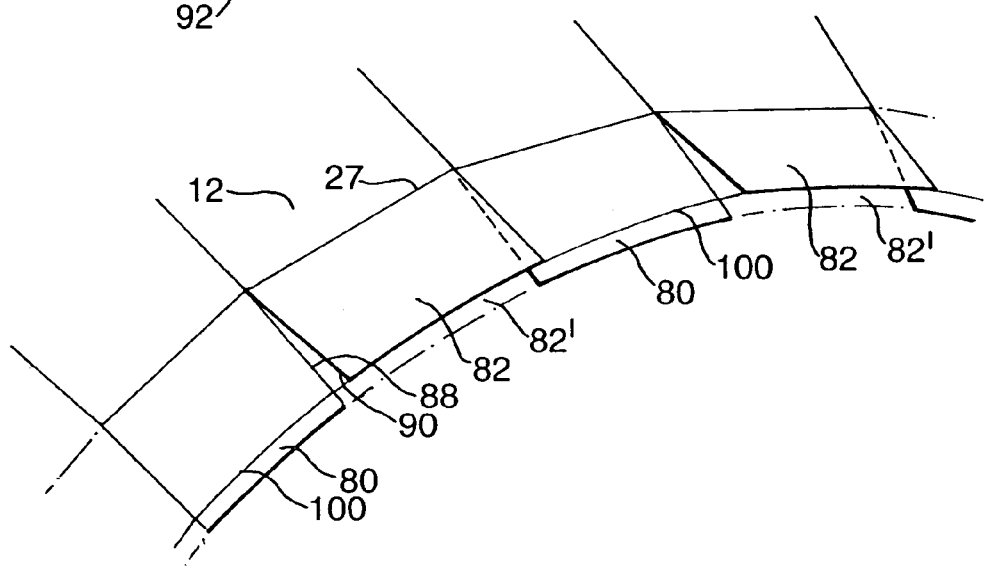
FIG. 14 is a more detailed schematic perspective view of the exhaust nozzle assembly, comprising a tenth embodiment of the deployable noise reduction means, of a ducted fan gas turbine engine.

A further embodiment of the noise reducing means of the present invention, shown on FIG. 14, comprises fixed tabs 80 and moveable tabs 82 alternately disposed about the downstream periphery 27 of the bypass nozzle 12. The moveable tabs 82 are deployable between a non-deployed position shown by the dashed lines and 82' and a deployed position 82. The moveable tabs 82 are joined together by an SMM element 100. The SMM element 100 spans between each tab 82, alternatively the SMM element 100 is a complete annular element attached discretely to each tab 82. In use the SMM element 100 operates in similar fashion as the temperature or electrically controlled SMM material described hereinbefore. The SMM element 100 is preferably a wire although it may also be in the form of a strip. As the modulus of elasticity of the SMM material changes, influenced by a change in an applied field (temperature or electrical fields), the tabs 82 move between the deployed and non-deployed position 82'. The tabs 82 are "sprung" against the SMM element 100, so that when the stiffness of the SMM element 100 decreases the tabs 82 overcome the reduced stiffness of the SMM element 100 and move to their deployed position.

It is an advantage of this embodiment that the fixed tabs 80 provide an end stop for the SMM element 100. When the moveable tabs 82' are in their non-deployed position it is preferable for there to be a close fit between adjacent edges 88, 90 of the tabs 80, 82 to prevent leakage of gases therethrough. By configuring the tabs 80, 82 to overlap or abut one another, in the non-deployed position, the SMM element 100 provides a positive force between the edges of the tabs 80, 82. It is desirable to initially over design the positive force provided by the SMM element 100 so that despite potential hysteresis of the SMM material the SMM element 100 will continue to provide a positive force between the tabs 80, 82. It should be realised by one skilled in the art that many configurations of end stop are possible, however, it intended that the end stop provides a positive locator for the tab 20, 20' either in its deployed or non-deployed position.

In this embodiment, deployment of the tabs 80 increases the effective area of the nozzle 12 thereby for any given mass flow the velocity of the exhausted gas stream is reduced as well as the tabs 80 operating as a noise reducing means. In the non-deployed position, at aircraft cruise, the nozzle 20 exhaust area is minimised thereby increasing the velocity of the exhaust gases. The increased relative velocity of the exhaust gas stream and the ambient air provides additional thrust. Alternatively, this increases the efficiency of the engine and reduces the specific fuel consumption advantageously. With more normal, fixed nozzles, there is a design compromise between nozzle area at take off and at cruise. A large area is needed at take off in order to avoid flutter of the fan or LP compressor. A smaller area generally being needed at cruise to provide efficiency, which leads to a reduction in efficiency at cruise when using a fixed nozzle. With the arrangement shown in FIG. 14, the tabs that are primarily for noise reduction can also provide performance improvements. In the deployed position (tabs 82 moved out), the effective increase in nozzle area can be used to control fan flutter during take off and climb. The area being reduced when closed to the position 82'. Alternatively, the tabs 80 could also move to provide the optimum effect. This arrangement also provides the additional advantage of a clean nozzle at cruise, which avoids the parasitic losses that occur in previously described arrangements when the tabs 82 are retracted. This provides a significant improvement in efficiency.

Figure 15:
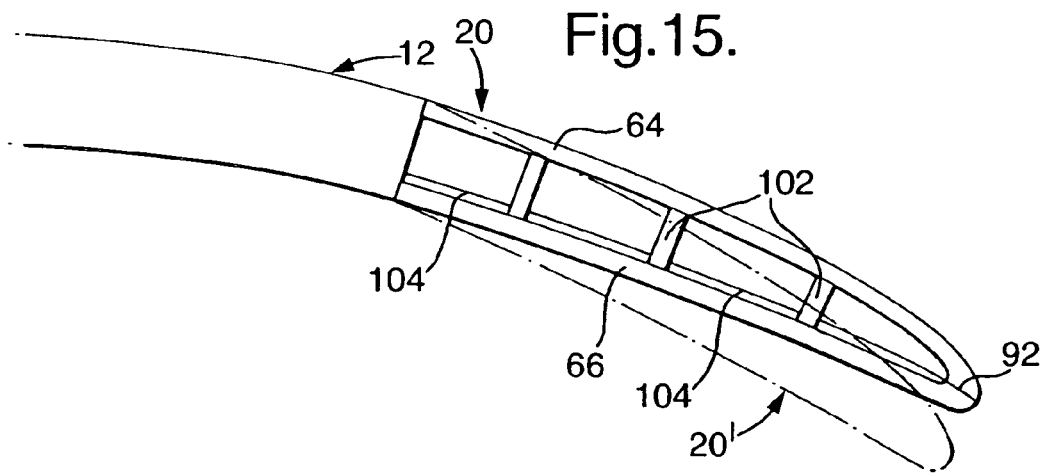
FIG. 15 is a section through the part of the core nozzle and shows an eleventh embodiment of the present invention.

FIG. 15 shows another embodiment of the present in which a deployable tab 20 comprises flexural element 64 and SMM element 66 spaced apart and joined together by webs 102. The flexural element 64 and the SMM element 66 are further joined together at the downstream edge 92 of the tab 20. A plurality of ties 104 extends between the nozzle 12, webs 102 and the downstream edge 92. Typically, at ground temperatures the SMM element has a high elastic modulus which forces the tab into the deployed position as shown by tab 20'. At altitude and therefore generally lower temperatures the SMM element 66 has a low elastic modulus and here the flexural element 64 provides a returning force which sufficient to overcome the stiffness of the SMM element 66 and return the tab to its non-deployed position. The ties 104 are configured to provide an end stop to maintain the tab 20 in a preferred aerodynamic and non-deployed position particularly at aircraft cruise conditions.

It should also be understood to the skilled reader that the temperature controlled shape memory material herein described may also be activated by electrical heating elements disposed to or within the shape memory material. Thus the shape memory material may be controlled by aircraft systems such as an altimeter, which may be arranged to operate the heating elements at a predetermined aircraft height above which exhaust noise is not a problem.

With reference to all the noise reduction means described herein, a further advantage of the present invention is that the degree to which the tabs 18, 20 are extended into the gas stream may be optimised easily during testing and evaluation. Furthermore the tabs 18, 20 may be deployed to varying extents during the flight cycle of the host aircraft and thereby attenuate different noise frequencies.

Arranging certain tabs 20 to deploy radially inwardly and other tabs to deploy radially outwardly provide a further embodiment of the present invention. Preferably, the alternate tabs 20 are arranged to deploy inwardly and outwardly around the entire periphery of the nozzle 15. The benefits of this arrangement are described in EP0984152 A2 and will therefore not be reiterated herein.

As an alternative to using shape memory material as an actuator a volume change material may be used. The use of wax like substances are well known for their increased volume change from solid to liquid phases in response to a temperature change. Thus from the teachings of description hereinbefore it should be understood to one skilled in the art that a suitable actuator mechanism could be easily substituted for the shape memory material actuators. For instance a wax like material may be disposed in a piston type arrangement, so that the piston is extended when the wax is in a liquid phase and when the wax is in a solid phase the piston is shorter.

Furthermore in yet another embodiment of the invention a bypass exhaust nozzle using tabs as described above can be used in conjunction with a conventional forced lobed type core exhaust nozzle/mixer. Such an arrangement has also been tested and has shown improved noise suppression over an exhaust assembly which uses a lobed type core nozzle/mixer with a conventional bypass exhaust nozzle.

Although the invention has been described and shown with reference to a short cowl type engine arrangement in which the bypass duct 28 and bypass exhaust nozzle 12 terminate upstream of the core exhaust duct 30 and nozzle 14, the invention may also be applied, in other embodiments, to long cowl type engine arrangements in which the bypass duct 28 and bypass exhaust nozzle 12 terminate downstream of the core exhaust duct 20 and nozzle 14. The invention however is particularly beneficial to short cowl arrangements since with such arrangements conventional noise suppression treatments of the exhaust are not practical in particular where high by pass ratios are also used.

The invention is also not limited to ducted fan gas turbine engines 10 with which in this embodiment it has been described and to which the invention is particularly suited. In other embodiments it can be applied to other gas turbine engine arrangements in which either two exhaust streams, one exhaust stream or any number of exhaust streams are exhausted from the engine though an exhaust nozzle(s).

The present invention further relates to a shape change structure (also referred to as a sandwich structure) comprising two elements separated by a core. One of the elements comprises a resilient parent element and the other comprises an SMM element. The elements are sometimes referred to as facings. Alternatively a separate facing can be applied over the elements.

The core is present to space the elements apart during flexure and has a relatively low bending stiffness. Preferably, the core substantially maintains the distance between the two elements during flexing of the sandwich structure. In a first embodiment the core comprises a number of discrete webs as shown in FIG. 15, with reference to a turbine engine exhaust nozzle. In alternative embodiments, the core may comprise a) one continuous web member, b) a foamed material c) a honeycombed structure. Each core embodiment is relatively lightweight and capable of transferring shear stresses between the facings.

While any suitable SMM can be utilised, preferred SMMs are those that undergo a phase change when heated through a pre-determined temperature range. This is manifested as a change in properties. In its simplest form, a material can be "plastically" deformed when cold and will recover to its original state on heating. If an external load, such as a spring, is applied, the change in properties is conventionally considered a change in Young's modulus of the material. When acting against the spring, the change in Young's modulus leads to two equilibrium positions as the compression or expansion of the SMM changes. More than two conditions could be useful, but suitable materials are not currently known. An example of a suitable SMM is one that expands by at least about 1%, preferably at least about 2% in volume, over a temperature range of about 20° C. or less. The movement is further enhanced by the low temperature/low modulus condition having a low yield stress, above which plastic deformation occurs, to provide even larger movements at low stress. This plastic deformation is recoverable as the temperature increases.

Referring to FIG. 15, which shows the sandwich structure of the present invention and is an exemplary embodiment, the deployable tab 20 comprises resilient flexural parent element 64 and SMM element 66 spaced apart and joined together by webs 102. The parent element 64 and the SMM element 66 are further joined together at the downstream edge 92 of the tab 20. Typically, at ground temperatures the SMM has a high elastic modulus which forces the tab into the deployed position as shown by tab 20'. At altitude and therefore generally lower temperatures the SMM element 66 has a low elastic modulus and here the parent element 64 provides a sufficient returning force to overcome the stiffness of the SMM element 66 and return the tab to its non-deployed position.

Figure 16A:
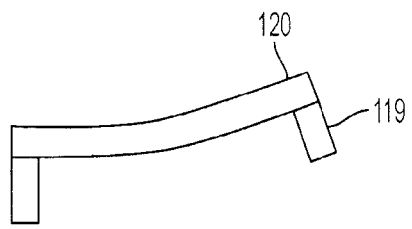
FIGS. 16A through 16D illustrate a beam comprising SMM and a parent structure according to the present invention in different positions under stress and varying modulus conditions.
Figure 16B:
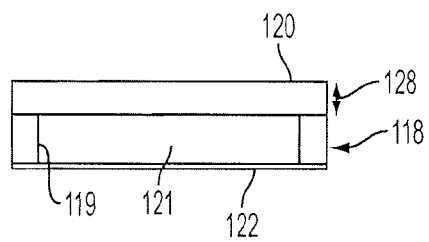
Figure 16C:
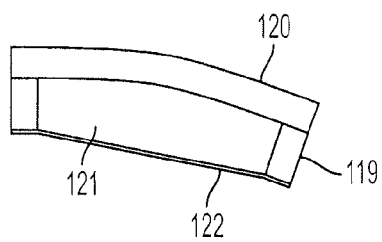

The sandwich arrangement of the present invention provides the unexpected combination of a high stiffness and high deflection mechanism, which can be designed to operate substantially in bending against external loads. It also provides manufacturing and positioning methods. The structure is inherently robust and lightweight. A further representation of a single segment of the sandwich structure 118 is shown in FIGS. 16A-16D. FIG. 16A shows an unstressed parent element 120 and webs 119. In this example, the webs 119 are formed from the parent material. FIG. 16B shows the sandwich structure 118 comprising the SMM element 122 mated to the parent element 120 by webs 119 defining a core 121. The sandwich structure 118 is in a stressed position with the SMM element 122 in a low Young's modulus condition and the parent element 120 being bent. In this example, only a thin section of the parent element 120 is bent from its free position. FIG. 16C shows the sandwich structure 118 in a stressed position with the SMM element 122 in a high Young's modulus condition. The parent element 120 is bent further than when the SMM element 122 is in a low Young's modulus condition. Current alloys (Nickel Titanium) typically have a modulus of about 85 GPa when hot. When cold, the modulus is typically about 30 GPa, with significant yield occurring above a stress of 85 Mpa. Above this, a repeated strain of 2% will still provide a good fatigue life of an engineering component. Future materials are likely to have significantly different values and could have entirely different characteristics. The important parameter is the change in deflection which occurs with change in temperature.

The design of a component is a compromise between tension (or compression) in the SMM element, the bending stiffness of the bending element of the parent structure and the combined stiffness against external loads. The important input parameters are the Young's modulus when hot and cold and the plastic deformation of the SMM, the Young's modulus of the parent structure, the thickness of the parent structure, and the distance between the parent structure bending element and the SMM. Current alloys are sub optimal, a larger change in modulus is desirable, but probably unobtainable. Design of the component within these parameters will be the subject of normal engineering compromises.

Figure 16D:
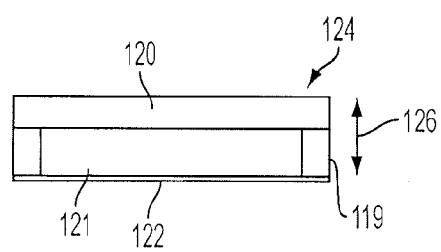

FIG. 16D shows the sandwich structure 118 acting against an external load 124. The sandwich structure 118 provides the advantage of acting like a thick rigid beam 126 against external loads shown at 124, while acting like a thin beam shown at 128 shown in FIG. 16B during flexing of the sandwich structure 118. In other words, the functions of bending for actuation and resistance to bending from external loads have substantially been separated and optimisation of the two is to some extent separated. Furthermore, high strains (typically ~2%) can be used in the SMM while at the same time maintaining low actuation strains in the flexural facing. This provides the further advantage of using the SMM to its best advantage, providing a lower weight, cost and response time to heating.

Figure 17A:
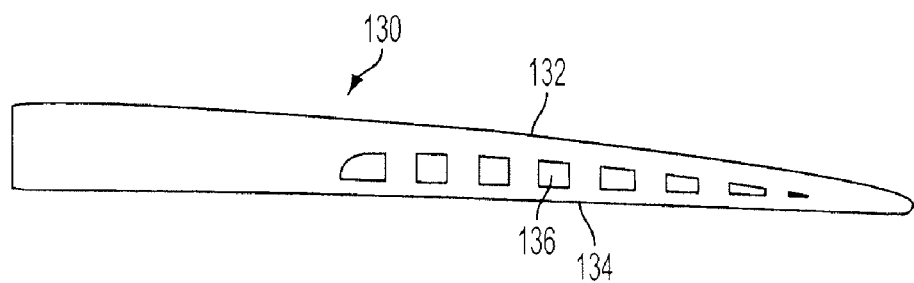
FIGS. 17A and 17B illustrate a component comprising multiple SMM units according to the present invention in low and high temperature positions.
Figure 17B:
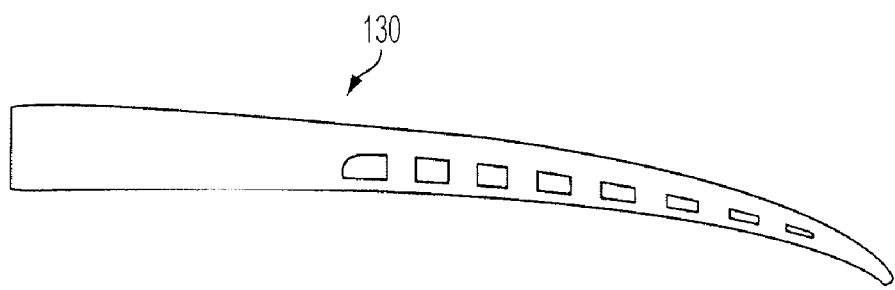

Multiple segments of the sandwich structure 118 can be used to form a complete component 130 as shown in FIGS. 17A and 17B. The component 130 has a plurality of sandwich structures comprising parent element 132 mated to SMM element 134 by a core 136. FIG. 17A shows the component 130 in a first required position at a low temperature, in which the SMM facing 134 is under low Young's modulus. FIG. 17B shows the component 13 in a second required position at a higher temperature, in which the SMM element 134 is under a higher Young's modulus.

Analysis of international airport, altitude temperature statistics and engine temperature rises suggests a transition temperature requirement of about 50° C. when the air temperature within the engine bypass duct is used as the controlling parameter. With a (current) limit on transition band, a lower temperature limit of about 40° C. and an upper limit of about 60° C. gives good performance for the system. Alternatively, the external ambient temperature can be used, this then requires a transition temperature in the region of about 10° C.

Thermal insulation either within or on the outside of the component can help the structure respond to respond to one or the other of these air streams. Alternatively, it can also be used to slow the response to external changes for applications where rapid transients must be ignored.

Figure 18A:
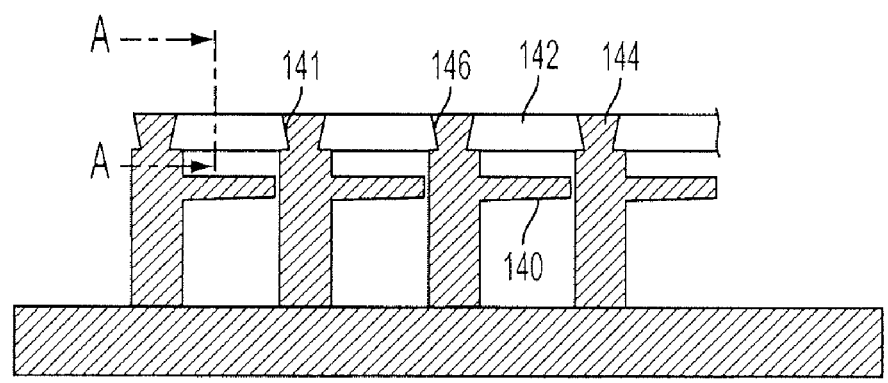
FIG. 18A illustrates a tab having SMM components mounted therein.
Figure 18B:
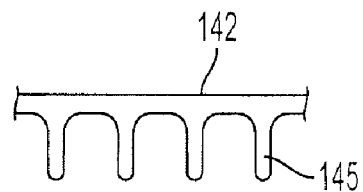
FIGS. 18B and 18C illustrates an SMM having integral ribs.
Figure 18C:
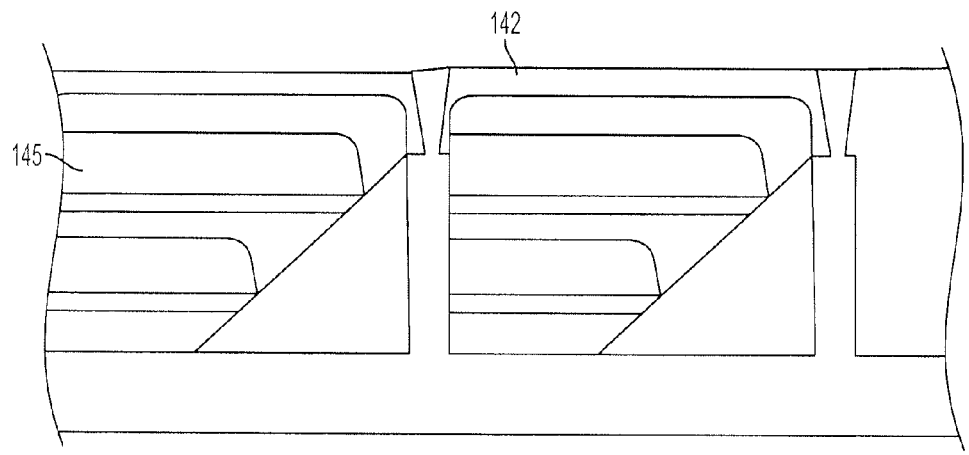

The component 130 is for example only and by using different stressing regimes, materials, etc., different movements and stable positions can be achieved as desired. With appropriate pre-stressing of the parent structure, the SMM can be operated in either tension or compression. FIG. 16 shows operation with the SMM in tension, whilst FIG. 18A shows the SMM 142 in compression. The latter has the advantage of simplified construction, where compression joints can be used, but also needs careful consideration of buckling in the SMM 142. Buckling can be overcome by using short SMM elements and/or using integral ribs as shown in FIGS. 18B and 18C. FIGS. 18B and 18C show integral ribs 145. FIG. 18A show the ribs 145 along section AA. The integral ribs 145 can be aligned as desired to provide structural support for the desired application. The ribs 145 can be formed or mounted on the outside surface of the SMM 142 to provide stiffening and heat conduction. The ribs 145 can also be formed or mounted on the inside surface of the SMM 142. In some cases, buckling can be used to give increased actuation movement, but great care in the stability of the component is needed. While two positions are shown above, multiple stable positions can be achieved by any one or more of controlling the temperature within the transition band, using several layers or strips of SMM having different properties, preferential heating of different areas, and using an SMM having more than one property transformation.

In FIG. 15, a plurality of ties 104 extends between the nozzle 12, webs 102 and the downstream edge 92. The ties 104 are configured to provide an end stop to maintain the tab 20 in preferred aerodynamic and non-deployed position particularly at aircraft cruise conditions and noise reduction modes respectively.

External end stops will be practical in some applications, but are generally unattractive due to losses, which can occur due to effects such as aerodynamic drag. In the case shown in FIG. 14, where the two sets of tabs are close, a small overlap or step in the serrations can be used to form an end stop at the closed condition.

Further arrangements for controlling the movement of the SMM are shown in FIGS. 18A through 19F. FIG. 18A shows the use of end stops 140 to limit the movement of the SMM facing 141 and parent material 144. Two stable deployed and un-deployed positions are achieved by the use of the end stops 140 in one or both of the positions. The end stop 140 generally comprises a gap that closes up in one position to prevent further movement of the SMM facing 141 and parent material 144.

Figure 19A:
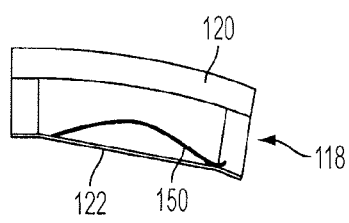
FIGS. 19A through 19F illustrate different mechanisms to use SMM in a beam structure.

FIG. 19A shows the use of a secondary tether 150 that buckles under a bent condition but restrains the parent element 120 to straight (or other radius as desired) when the SMM element 122 is extended. If desired, diagonal tethers can also be used to restrain movement in both directions.

Figure 19D:
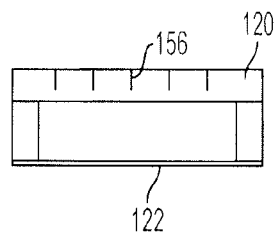
Figure 19B:
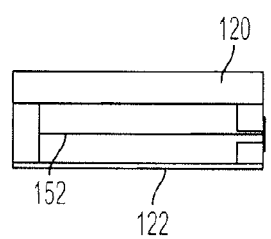
Figure 19E:
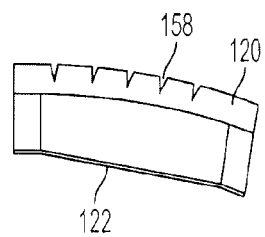
Figure 19C:
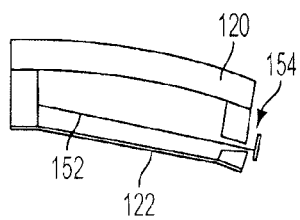

FIGS. 19B and 19C show the use of a tie-bar 152 to restrain the movement of the parent element 120. As shown in FIG. 19C, the tie-bar 152 has a loose end stop-gap shown at 154 that closes when the limit of movement is reached. FIG. 19B shows the stop-gap in a closed position with the limit of movement reached.

FIGS. 19D and 19E show the use of a notch mechanism to restrain the movement of the parent element 120. Notches 156 shown in closed position at the limit of movement of the parent element 120. While a straight maximum position is shown in FIG. 19D, the notches 156 can be formed to provide any maximum radius desired. Open notches 158 are shown in FIG. 19E. If desired, the notches 156 can be formed on the inside of the parent material 120 to limit the bending of the parent material 120. Fabricated or built up structures can also be used to provide a similar effect, but with less weight.

Figure 19F:
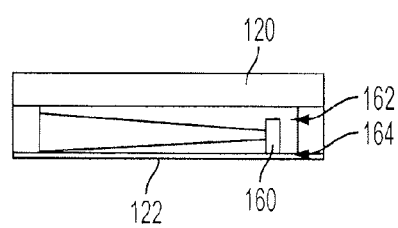

FIG. 19F shows the use of an internal beam structure 160 to provide stops for limiting the movement of the parent material 120. A gap is shown at 162, which limits the movement of the parent material 120 in one direction. The parent material 120 is shown at a limit in another direction with the gap closed at 164.

Figure 20:
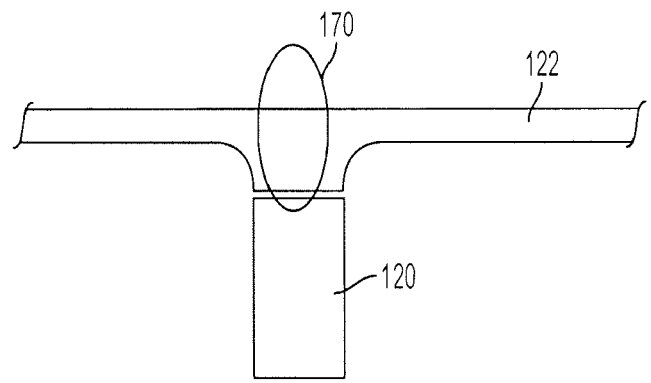
FIG. 20 illustrates a welded SMM.

Fabrication of sandwich structures 118 requires joining of SMM material to parent material, which is notoriously difficult. Welding is preferable, but control of stresses around the joint must be achieved. A boss in the SMM can be used to reduce the stress. FIG. 20 shows an area of degradation 170 from welding the SMA 122 to the parent material 120.

As shown in FIG. 18A, the SMM 142 can be mated to the parent material 144 using compression, or possibly with the use of an adhesive. In this embodiment, the SMM 142 is inserted into suitably shaped slots 146 in the parent material 144 and are held in place by compression.

Figure 21A:
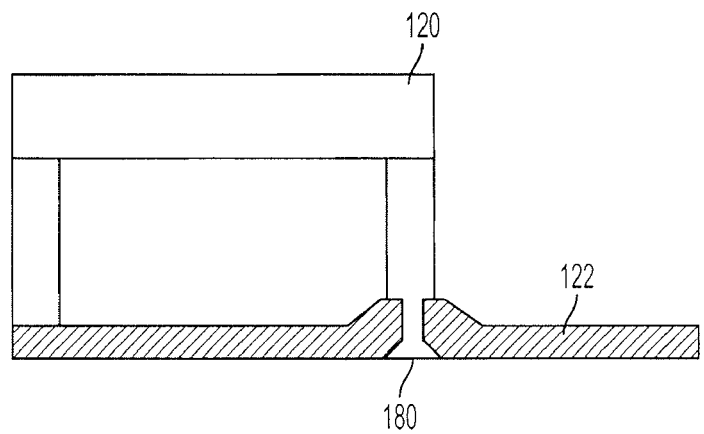
FIGS. 21A and 21B illustrate rivet and dovetail constructions containing SMM.
Figure 21B:
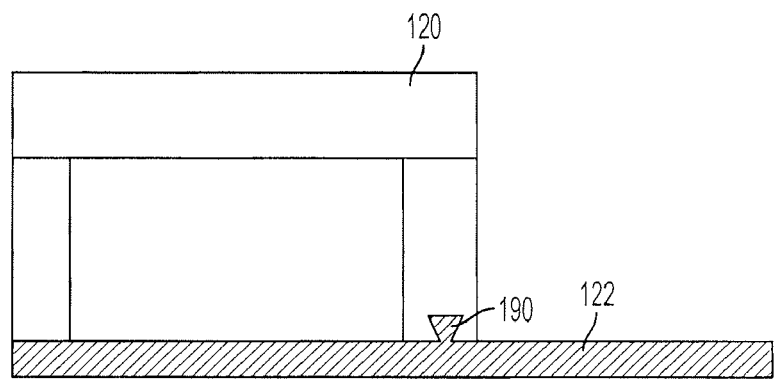
Figure 22:
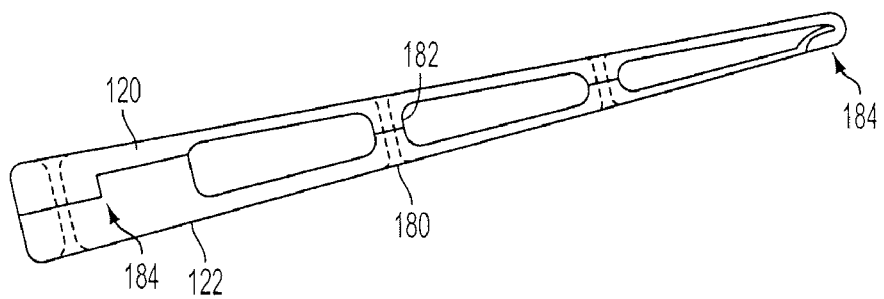
FIG. 22 illustrates a riveted component containing SMM.
Figure 23:
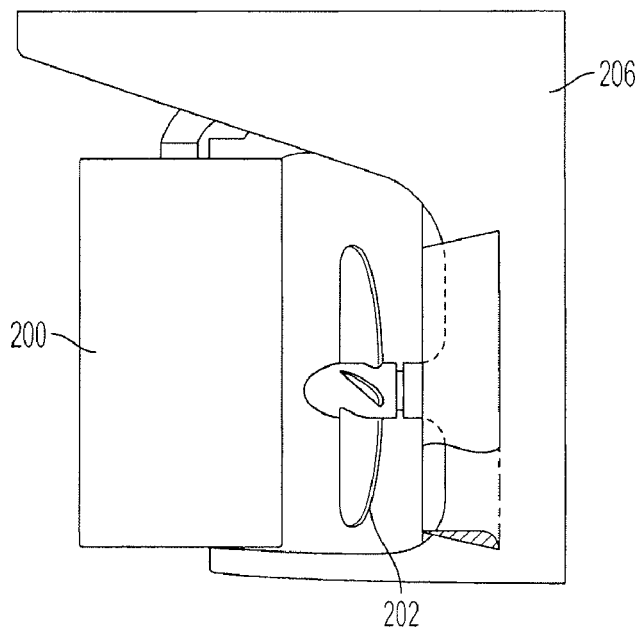
FIG. 23 illustrates marine elements, including a hull surface, a rudder, a propeller and a duct.
Figure 24:
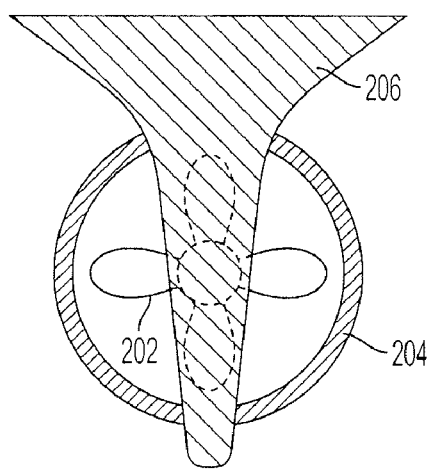
FIG. 24 illustrates marine elements, including a hull surface, a rudder, a propeller and a duct.

Another method for joining the SMM 122 to the parent material 120 is the use of rivets 180, as shown in FIGS. 21A and 22. A further method of joining the SMM 122 to the parent material 120 is the use of a dovetail structure 190 as shown in FIG. 21B.

Internal bosses 182 for stress reduction across rivets 180 can be used, as shown in FIG. 22. A hook and step structure shown at 184 can be used to hold tension in the SMM, with the maximum stress at the ends of the SMM. In this structure, shear across rivets 180 is minimised since the bosses 182 meet at the bending mid-point.

The sandwich structure 118 is applicable for use in an aerofoil (blade or vane) as part or the whole of the aerofoil structure. The sandwich structure 118 could also have broad ranging applications, including but not limited to automotive air flow controls, heating and air conditioning systems such as shape changing valve flaps, and marine uses such as shape changing rudders, 200, propellers 202, ducts 204, or hull surfaces 206.

While the claimed invention has been described in detail and with reference to specific embodiments thereof, it will be apparent to one of ordinary skill in the art that various changes and modifications can be made to the claimed invention without departing from the spirit and scope thereof.

I claim:

1. A shape change structure that changes shape upon a change in modulus, the structure comprising:
   a flexural resilient parent element;
   a shape memory material element that changes modulus between a first Young's modulus and a second Young's modulus; and
   a core disposed between the elements, wherein the elements are operatively associated such that changes in the modulus effects a change of shape of the structure and a substantially constant distance between the elements is maintained by the core, wherein the shape change structure comprises at least a portion of a gas turbine engine part that is constructed and arranged to contact and interact with a fluid flow during operation of the gas turbine engine.

2. A shape change structure according to claim 1, wherein the shape memory material element changes modulus based on temperature.

3. A shape change structure according to claim 1, further comprising at least one stop constructed and arranged to limit the movement of the structure resulting from the change in modulus.

4. A shape change structure according to claim 1, further comprising at least one tether constructed and arranged to limit the movement of the structure resulting from the change in modulus.

5. A shape change structure according to claim 1, further comprising at least one tie bar constructed and arranged to limit the movement of the structure resulting from the change in modulus.

6. A shape change structure according to claim 1, further comprising at least one notch constructed and arranged in the parent element to limit the movement of the structure by the change in modulus.

7. A shape change structure according to claim 1, wherein the elements are connected by at least one weld.

8. A shape change structure according to claim 1, wherein the elements are connected by at least one rivet.

9. A shape change structure according to claim 1, wherein the elements are connected by compression joints.

10. A shape change structure according to claim 1, wherein the core comprises at least one web.

11. A shape change structure according to claim 1, wherein the core comprises a foam.

12. A shape change structure according to claim 1, wherein the core comprises a honeycomb structure.

13. A shape change structure according to claim 1, wherein the structure comprises an aerofoil.

14. A shape change structure according to claim 13, wherein the aerofoil comprises a blade or vane.

15. A shape change structure according to claim 1, wherein the structure comprises a shape changing valve flap.

16. A shape change structure according to claim 1, wherein the shape memory material element comprises at least one metal selected from the group consisting of Titanium, Manganese, Iron, Aluminium, Silicon, Nickel, Copper, Zinc, Silver, Cadmium, Indium, Tin, Lead, Thallium, and Platinum.

17. A shape change structure according to claim 1, wherein the shape change structure is constructed and arranged such that plastic deformation of the shape memory material element provides movement of the shape change structure in addition to the Young's modulus change.

18. A shape change structure according to claim 1, wherein the shape change structure is constructed and arranged such that the shape memory material element is stressed substantially in compression or tension.

19. A shape change structure according to claim 18, wherein when the shape memory material element is stressed substantially in compression the shape change structure further comprises short segments or ribs formed on at least one of the elements to prevent or control buckling.

20. A shape change structure according to any one of claims 1, 9, 17 and 18, wherein the shape change structure is constructed and arranged such that the movement is limited by contact with an adjacent component.

21. A shape change structure according to any one of claims 1, 9, 17 and 18, wherein the shape change structure is constructed and arranged such that the movement is limited by contact with an adjacent casing or adjacent tab.

22. A shape change structure according to claim 1, wherein the shape change material element has a transition temperature matching changes in ambient operating temperatures of the shape change structure.

23. A shape change structure according to claim 1, wherein the shape change material element has a transition temperature matching an operating temperature of a machine the shape change structure is part of.

24. A shape change structure according to one of claims 22 and 23, wherein the shape change structure comprises at least one tab on a bypass nozzle of a turbofan engine and the tab is sensitive to bypass temperature and the transition between the first and second Young's modulus is set in a region of about 50° C.

25. A shape change structure according to one of claim 22 and 23, wherein the shape change structure comprises at least one tab on a bypass nozzle of a turbofan engine and the tab is sensitive to external air temperature and the transition between the first and second Young's modulus is set in a region of about 10° C.

26. A shape change structure according to claim 1, further comprising electrical heating means to control the temperature of the shape memory material element.

27. A shape change structure according to claim 26 wherein the electrical heating means comprises at least one of means for passing an electrical current through the shape memory material element, an electrical blanket, or means for induction heating.

28. A shape change structure according to claim 1, further comprising thermal insulation constructed and arranged to enhance response of the shape change structure by isolating the shape memory material element from flows that are at temperatures away from a desired control flow.

29. A shape change structure according to claim 28, wherein ambient flow is used to control flow and the thermal insulation is located on an opposite side of the shape change structure from the ambient flow.

30. A shape change structure according to claim 28, further comprising internal flow control structure to control the temperature of the shape memory material element and the insulation substantially isolates the shape change structure from external temperature effects.

31. A shape change structure according to claim 1, wherein the shape change structure comprises a portion that is constructed and arranged to move between a non-deployed position and at least one deployed position, and a portion that is constructed and arranged to be attached to a part of a gas turbine engine.

32. A shape change structure that changes shape upon a change in modulus, the structure comprising:
a flexural resilient parent element;
a shape memory material element that changes modulus between a first Young's modulus and a second Young's modulus; and
a core disposed between the elements, wherein the elements are operatively associated such that changes in the modulus effects a change of shape of the structure and a substantially constant distance between the elements is maintained by the core, wherein the shape change structure is constructed and arranged to interact with or control a fluid, and wherein the structure comprises at least one of marine element selected from the group consisting of shape changing rudders, propellers, ducts, and hull surfaces.

33. A method of changing a shape of a shape change structure in contact with a flowing fluid, the structure comprising a flexural resilient parent element, a shape memory material element that changes modulus between a first Young's modulus and a second Young's modulus, and a core disposed between the elements, wherein the elements are operatively associated such that changes in the modulus effects a change of shape of the structure and a substantially constant distance between the elements is maintained by the core, the method comprising the step of changing a temperature of the structure to effect a change in modulus and change in shape of the structure interacting with the flowing fluid, wherein the shape change structure comprises at least a portion of a gas turbine engine part.

34. A method according to claim 33, further comprising using at least one stop to limit the movement of the structure by the change in modulus.

35. A method according to claim 33, further comprising using at least one tether to limit the movement of the structure by the change in modulus.

36. A method according to claim 33, further comprising using at least one tie bar to limit the movement of the structure by the change in modulus.

37. A method according to claim 33, further comprising using at least one notch in the parent material to limit the movement of the structure by the change in modulus.

38. A method according to claim 33, wherein the elements are connected by at least one weld.

39. A method according to claim 33, wherein the elements are connected by at least one rivet.

40. A method according to claim 33, wherein the elements are connected by compression joints.

41. A method according to claim 33, wherein the core comprises at least one web.

42. A method according to claim 33, wherein the core comprises a foam.

43. A method according to claim 33, wherein the structure comprises an aerofoil.

44. A method according to claim 43, wherein the aerofoil comprises a blade or vane.

45. A method according to claim 33, wherein the structure comprises a shape changing valve flap.

46. A method according to claim 33, wherein the shape memory material element comprises at least one metal selected from the group consisting of Titanium, Manganese, Iron, Aluminium, Silicon, Nickel, Copper, Zinc, Silver, Cadmium, Indium, Tin, Lead, Thallium, Platinum, Hafnium, Palladium and Zirconium.

47. A method according to claim 33, wherein a temperature of shape memory material is changed by a change in temperature of the fluid.

48. A method according to claim 33, wherein the shape change structure is constructed and arranged such that plastic deformation of the shape memory material element provides movement of the shape change structure in addition to the Young's modulus change.

49. A method according to claim 33, wherein the shape change structure is constructed and arranged such that the shape memory material element is stressed substantially in compression or tension.

50. A method according to claim 49, wherein when the shape memory material element is stressed substantially in compression the shape change structure further comprises short segments or ribs formed on at least one of the elements to prevent or control buckling.

51. A method according to any one of claims 33, 48 and 49, wherein the shape change structure is constructed and arranged such that the movement is limited by contact with an adjacent component.

52. A method according to any one of claims 33, 48 and 49, wherein the shape change structure is constructed and arranged such that the movement is limited by contact with an adjacent casing or adjacent tab.

53. A method according to any one of claims 33, 48 and 49, wherein the shape change material element has a transition temperature matching changes in ambient operating temperatures of the shape change structure.

54. A method according to any one of claims 33, 48 and 49, wherein the shape change material element has a transition temperature matching an operating temperature of a machine the shape change structure is part of.

55. A method according to any one of claims 33, 48 and 49, further comprising controlling the temperature of the shape memory material element using an electrical heating means.

56. A method according to claim 55, wherein the electrical heating means comprises at least one of means for passing an electrical current through the shape memory material element, an electrical blanket, or means for induction heating.

57. A method according to claim 33, wherein the shape change structure comprises a portion that is constructed and arranged to move between a non-deployed position and at least one deployed position, and a portion that is constructed and arranged to be attached to a part of a gas turbine engine.

58. A method of changing a shape of a shape change structure in contact with a flowing fluid, the structure comprising a flexural resilient parent element, a shape memory material element that changes modulus between a first Young's modulus and a second Young's modulus, and a core disposed between the elements, wherein the elements are operatively associated such that changes in the modulus effects a change of shape of the structure and a substantially constant distance between the elements is maintained by the core, the method comprising the step of changing a temperature of the structure to effect a change in modulus and change in shape of the structure which alters a characteristic of the flowing fluid, wherein the structure comprises at least one of marine element selected from the group consisting of shape changing rudders, propellers, ducts, or hull surfaces.

59. A method of changing a shape of a shape change structure in contact with a flowing fluid, the structure comprising a flexural resilient parent element, a shape memory material element that changes modulus between a first Young's modulus and a second Young's modulus, and a core disposed between the elements, wherein the elements are operatively associated such that changes in the modulus effects a change of shape of the structure and a substantially constant distance between the elements is maintained by the core, the method comprising the step of changing a temperature of the structure to effect a change in modulus and change in shape of the structure which alters a characteristic of the flowing fluid, wherein the shape change structure comprises at least one tab on a bypass nozzle of a turbofan engine and the tab is sensitive to bypass temperature and using the bypass temperature to change the temperature of the structure.

60. A method of changing a shape of a shape change structure in contact with a flowing fluid, the structure comprising a flexural resilient parent element, a shape memory material element that changes modulus between a first Young's modulus and a second Young's modulus, and a core disposed between the elements, wherein the elements are operatively associated such that changes in the modulus effects a change of shape of the structure and a substantially constant distance between the elements is maintained by the core, the method comprising the step of changing a temperature of the structure to effect a change in modulus and change in shape of the structure which alters a characteristic of the flowing fluid, wherein the shape change structure comprises at least one tab on a bypass nozzle of a turbofan engine and the tab is sensitive to external air temperature and using the external air temperature to change the temperature of the structure.

61. A method of changing a shape of a shape change structure in contact with a flowing fluid, the structure comprising a flexural resilient parent element, a shape memory material element that changes modulus between a first Young's modulus and a second Young's modulus, and a core disposed between the elements, wherein the elements are operatively associated such that changes in the modulus effects a change of shape of the structure and a substantially constant distance between the elements is maintained by the core, the method comprising the step of changing a temperature of the structure to effect a change in modulus and change in shape of the structure which alters a characteristic of the flowing fluid, further comprising using thermal insulation to enhance response of the shape change structure by isolating the shape memory material element from flows that are at temperatures away from a desired control flow.

62. A method of changing a shape of a shape change structure in contact with a flowing fluid, the structure comprising a flexural resilient parent element, a shape memory material element that changes modulus between a first Young's modulus and a second Young's modulus, and a core disposed between the elements, wherein the elements are operatively associated such that changes in the modulus effects a change of shape of the structure and a substantially constant distance between the elements is maintained by the core, the method comprising the step of changing a temperature of the structure to effect a change in modulus and change in shape of the structure which alters a characteristic of the flowing fluid, further comprising using ambient flow to control flow and thermal insulation is located on an opposite side of the shape change structure from the ambient flow.

63. A method of changing a shape of a shape change structure in contact with a flowing fluid, the structure comprising a flexural resilient parent element, a shape memory material element that changes modulus between a first Young's modulus and a second Young's modulus, and a core disposed between the elements, wherein the elements are operatively associated such that changes in the modulus effects a change of shape of the structure and a substantially constant distance between the elements is maintained by the core, the method comprising the step of changing a temperature of the structure to effect a change in modulus and change in shape of the structure which alters a characteristic of the flowing fluid, further comprising controlling the temperature of the shape memory material element by using an internal flow control and using insulation to substantially isolate the shape change structure from external temperature effects.

64. A shape change structure that changes shape upon a change in modulus, the structure comprising:
   a flexural resilient parent element;
   a shape memory material element that changes modulus between a first Young's modulus and a second Young's modulus; and
   a core disposed between the elements, wherein the elements are operatively associated such that changes in the modulus effects a change of shape of the structure and a substantially constant distance between the elements is maintained by the core, wherein the shape change structure is constructed and arranged to interact with or control a fluid, further comprising at least one tether constructed and arranged to limit the movement of the structure resulting from the change in modulus.

65. A shape change structure that changes shape upon a change in modulus, the structure comprising:
   a flexural resilient parent element;
   a shape memory material element that changes modulus between a first Young's modulus and a second Young's modulus; and
   a core disposed between the elements, wherein the elements are operatively associated such that changes in the modulus effects a change of shape of the structure and a substantially constant distance between the elements is maintained by the core, wherein the shape change structure is constructed and arranged to interact with or control a fluid, further comprising at least one notch constructed and arranged in the parent element to limit the movement of the structure by the change in modulus.

* * * * *